(12) United States Patent
Wu et al.

(10) Patent No.: US 9,124,085 B2
(45) Date of Patent: Sep. 1, 2015

(54) APPARATUS, METHOD AND ARTICLE FOR POWER STORAGE DEVICE FAILURE SAFETY

(71) Applicant: Gogoro, Inc., Hong Kong (CN)

(72) Inventors: Yi-Tsung Wu, New Taipei (TW); Hok-Sum Horace Luke, Mercer Island, WA (US); Wen-Hsien Tseng, Taichung (TW)

(73) Assignee: Gogoro Inc., Wanchai, Hong Kong (CN)

( * ) Notice: Subject to any disclaimer, the term of this patent is extended or adjusted under 35 U.S.C. 154(b) by 0 days.

(21) Appl. No.: 14/071,134

(22) Filed: Nov. 4, 2013

(65) Prior Publication Data

US 2015/0123468 A1    May 7, 2015

(51) Int. Cl.
   *B60L 1/00*    (2006.01)
   *B60L 3/00*    (2006.01)
   *H02G 3/00*    (2006.01)
   *H02H 1/00*    (2006.01)

(52) U.S. Cl.
   CPC ....................................... *H02H 1/00* (2013.01)

(58) Field of Classification Search
   USPC ................... 307/9.1, 10.1; 320/104, 107, 109
   See application file for complete search history.

(56) References Cited

U.S. PATENT DOCUMENTS

| | | |
|---|---|---|
| 1,387,848 A | 8/1921 | Good |
| 3,664,450 A | 5/1972 | Udden et al. |
| 3,678,455 A | 7/1972 | Levey |
| 4,087,895 A | 5/1978 | Etienne |
| 4,216,839 A | 8/1980 | Gould et al. |
| 5,187,423 A | 2/1993 | Marton |
| 5,189,325 A | 2/1993 | Jarczynski |

(Continued)

FOREIGN PATENT DOCUMENTS

| | | |
|---|---|---|
| EP | 0 693 813 A1 | 1/1996 |
| EP | 2 101 390 A2 | 9/2009 |

(Continued)

OTHER PUBLICATIONS

"Inrunner," retreived from URL=http://en.wikipedia.org/w/index.php?title=Inrunner&printable=yes on Sep. 28, 2011, 1 pages.

(Continued)

*Primary Examiner* — Rexford Barnie
*Assistant Examiner* — Rasem Mourad
(74) *Attorney, Agent, or Firm* — Seed IP Law Group PLLC

(57) ABSTRACT

In response to receiving information regarding an unsafe condition from portable electrical energy storage device (e.g., battery) safety sensors, a locking mechanism controller determines whether the battery is in a desired state to, as a safety measure, have the compartment that holds the battery locked and/or to send a signal to reduce or eliminate current draw from the battery. If the locking mechanism controller determines the battery is in the desired state to have the compartment locked, then it sends a signal to a compartment locking mechanism causing the compartment locking mechanism to lock the compartment in which the battery is located to prevent a user from opening the compartment, and thus helps protect the user against the unsafe condition. In some embodiments, the unsafe condition may be a potential or existing catastrophic failure of the battery in the compartment (e.g., a meltdown, explosion or dangerous leak, etc.).

20 Claims, 10 Drawing Sheets

(56) References Cited

U.S. PATENT DOCUMENTS

| | | | |
|---|---|---|---|
| 5,236,069 A | 8/1993 | Peng | |
| 5,339,250 A | 8/1994 | Durbin | |
| 5,349,535 A | 9/1994 | Gupta | |
| 5,544,784 A | 8/1996 | Malaspina | |
| 5,596,261 A | 1/1997 | Suyama | |
| 5,627,752 A | 5/1997 | Buck et al. | |
| 5,631,536 A | 5/1997 | Tseng | |
| 5,642,270 A | 6/1997 | Green et al. | |
| 5,815,824 A | 9/1998 | Saga et al. | |
| 5,839,800 A | 11/1998 | Koga et al. | |
| 5,898,282 A | 4/1999 | Drozdz et al. | |
| 5,998,963 A | 12/1999 | Aarseth | |
| 6,016,882 A | 1/2000 | Ishikawa | |
| 6,177,867 B1 | 1/2001 | Simon et al. | |
| 6,177,879 B1 | 1/2001 | Kokubu et al. | |
| 6,403,251 B1 | 6/2002 | Baggaley et al. | |
| 6,498,457 B1 | 12/2002 | Tsuboi | |
| 6,515,580 B1 | 2/2003 | Isoda et al. | |
| 6,593,713 B2 | 7/2003 | Morimoto et al. | |
| 6,796,396 B2 | 9/2004 | Kamen et al. | |
| 6,822,560 B2 | 11/2004 | Geber et al. | |
| 6,854,773 B2* | 2/2005 | Lin | 292/92 |
| 6,899,268 B2 | 5/2005 | Hara | |
| 6,952,795 B2 | 10/2005 | O'Gorman et al. | |
| 7,010,682 B2 | 3/2006 | Reinold et al. | |
| 7,131,005 B2 | 10/2006 | Levenson et al. | |
| 7,392,068 B2 | 6/2008 | Dayan et al. | |
| 7,415,332 B2 | 8/2008 | Ito et al. | |
| 7,426,910 B2 | 9/2008 | Elwart | |
| 7,495,543 B2 | 2/2009 | Denison et al. | |
| 7,567,166 B2 | 7/2009 | Bourgine De Meder | |
| 7,617,893 B2 | 11/2009 | Syed et al. | |
| 7,761,307 B2 | 7/2010 | Ochi et al. | |
| 7,778,746 B2 | 8/2010 | McLeod et al. | |
| 7,868,591 B2 | 1/2011 | Phillips et al. | |
| 7,898,439 B2 | 3/2011 | Bettez et al. | |
| 7,908,020 B2 | 3/2011 | Pieronek | |
| 7,948,207 B2 | 5/2011 | Scheucher | |
| 7,979,147 B1 | 7/2011 | Dunn | |
| 7,993,155 B2* | 8/2011 | Heichal et al. | 439/374 |
| 8,006,793 B2 | 8/2011 | Heichal et al. | |
| 8,006,973 B2 | 8/2011 | Toba et al. | |
| 8,013,571 B2 | 9/2011 | Agassi et al. | |
| 8,035,341 B2 | 10/2011 | Genzel et al. | |
| 8,035,349 B2 | 10/2011 | Lubawy | |
| 8,063,762 B2 | 11/2011 | Sid | |
| 8,068,952 B2 | 11/2011 | Valentine et al. | |
| 8,106,631 B2 | 1/2012 | Abe | |
| 8,118,132 B2 | 2/2012 | Gray, Jr. | |
| 8,164,300 B2* | 4/2012 | Agassi et al. | 320/104 |
| 8,229,625 B2 | 7/2012 | Lal et al. | |
| 8,265,816 B1 | 9/2012 | LaFrance | |
| 8,301,365 B2 | 10/2012 | Niwa et al. | |
| 8,326,259 B2 | 12/2012 | Gautama et al. | |
| 8,354,768 B2 | 1/2013 | Cipriani | |
| 8,378,627 B2 | 2/2013 | Asada et al. | |
| 8,412,401 B2 | 4/2013 | Bertosa et al. | |
| 8,437,908 B2 | 5/2013 | Goff et al. | |
| 8,614,565 B2 | 12/2013 | Lubawy | |
| 2001/0018903 A1 | 9/2001 | Hirose et al. | |
| 2002/0023789 A1 | 2/2002 | Morisawa et al. | |
| 2002/0070851 A1 | 6/2002 | Raichle et al. | |
| 2003/0141840 A1 | 7/2003 | Sanders | |
| 2003/0163434 A1 | 8/2003 | Barends | |
| 2003/0209375 A1 | 11/2003 | Suzuki et al. | |
| 2004/0236615 A1 | 11/2004 | Msndy | |
| 2004/0246119 A1 | 12/2004 | Martin et al. | |
| 2006/0047380 A1 | 3/2006 | Welch | |
| 2006/0208850 A1 | 9/2006 | Ikeuchi et al. | |
| 2006/0284601 A1 | 12/2006 | Salasoo et al. | |
| 2007/0026996 A1 | 2/2007 | Ayabe et al. | |
| 2007/0035397 A1 | 2/2007 | Patenaude et al. | |
| 2007/0090921 A1 | 4/2007 | Fisher | |
| 2007/0159297 A1 | 7/2007 | Paulk et al. | |
| 2007/0208468 A1 | 9/2007 | Sankaran et al. | |
| 2007/0296298 A1 | 12/2007 | Jones et al. | |
| 2009/0024872 A1 | 1/2009 | Beverly | |
| 2009/0033456 A1 | 2/2009 | Castillo et al. | |
| 2009/0082957 A1 | 3/2009 | Agassi et al. | |
| 2009/0112394 A1 | 4/2009 | Lepejian et al. | |
| 2009/0240575 A1 | 9/2009 | Bettez et al. | |
| 2009/0294188 A1 | 12/2009 | Cole | |
| 2010/0026238 A1 | 2/2010 | Suzuki et al. | |
| 2010/0051363 A1 | 3/2010 | Inoue et al. | |
| 2010/0052588 A1 | 3/2010 | Okamura et al. | |
| 2010/0089547 A1 | 4/2010 | King et al. | |
| 2010/0094496 A1* | 4/2010 | Hershkovitz et al. | 701/22 |
| 2010/0114798 A1 | 5/2010 | Sirton | |
| 2010/0161481 A1 | 6/2010 | Littrell | |
| 2010/0201482 A1 | 8/2010 | Robertson et al. | |
| 2010/0235043 A1 | 9/2010 | Seta et al. | |
| 2010/0250043 A1* | 9/2010 | Scheucher | 701/22 |
| 2010/0308989 A1 | 12/2010 | Gasper | |
| 2011/0025267 A1 | 2/2011 | Kamen et al. | |
| 2011/0029157 A1 | 2/2011 | Muzaffer | |
| 2011/0031929 A1 | 2/2011 | Asada et al. | |
| 2011/0032110 A1 | 2/2011 | Taguchi | |
| 2011/0071932 A1 | 3/2011 | Agassi et al. | |
| 2011/0106329 A1 | 5/2011 | Donnelly et al. | |
| 2011/0112710 A1 | 5/2011 | Meyer-Ebeling et al. | |
| 2011/0114798 A1 | 5/2011 | Gemmati | |
| 2011/0120789 A1 | 5/2011 | Teraya | |
| 2011/0148346 A1 | 6/2011 | Gagosz et al. | |
| 2011/0160992 A1 | 6/2011 | Crombez | |
| 2011/0169447 A1 | 7/2011 | Brown et al. | |
| 2011/0200193 A1 | 8/2011 | Blitz et al. | |
| 2011/0202476 A1 | 8/2011 | Nagy et al. | |
| 2011/0224900 A1 | 9/2011 | Hiruta et al. | |
| 2011/0270480 A1 | 11/2011 | Ishibashi et al. | |
| 2011/0279257 A1 | 11/2011 | Au et al. | |
| 2011/0292667 A1 | 12/2011 | Meyers | |
| 2011/0295454 A1 | 12/2011 | Meyers | |
| 2011/0303509 A1 | 12/2011 | Agassi et al. | |
| 2012/0000720 A1 | 1/2012 | Honda et al. | |
| 2012/0019196 A1 | 1/2012 | Fung | |
| 2012/0038473 A1 | 2/2012 | Fecher | |
| 2012/0062361 A1 | 3/2012 | Kosugi | |
| 2012/0068817 A1 | 3/2012 | Fisher | |
| 2012/0078413 A1 | 3/2012 | Baker, Jr. | |
| 2012/0105078 A1 | 5/2012 | Kikuchi et al. | |
| 2012/0109519 A1 | 5/2012 | Uyeki | |
| 2012/0123661 A1 | 5/2012 | Gray, Jr. | |
| 2012/0126969 A1 | 5/2012 | Wilbur et al. | |
| 2012/0158229 A1 | 6/2012 | Schaefer | |
| 2012/0194346 A1 | 8/2012 | Tsai et al. | |
| 2012/0248868 A1 | 10/2012 | Mobin et al. | |
| 2012/0248869 A1 | 10/2012 | Itagaki et al. | |
| 2012/0256588 A1 | 10/2012 | Hayashi et al. | |
| 2012/0259665 A1 | 10/2012 | Pandhi et al. | |
| 2012/0299537 A1 | 11/2012 | Kikuchi | |
| 2012/0316671 A1 | 12/2012 | Hammerslag et al. | |
| 2013/0024306 A1 | 1/2013 | Shah et al. | |
| 2013/0026971 A1 | 1/2013 | Luke et al. | |
| 2013/0026972 A1 | 1/2013 | Luke et al. | |
| 2013/0026973 A1 | 1/2013 | Luke et al. | |
| 2013/0027183 A1 | 1/2013 | Wu et al. | |
| 2013/0030580 A1 | 1/2013 | Luke et al. | |
| 2013/0030581 A1 | 1/2013 | Luke et al. | |
| 2013/0030608 A1 | 1/2013 | Taylor et al. | |
| 2013/0030630 A1 | 1/2013 | Luke et al. | |
| 2013/0030696 A1 | 1/2013 | Wu et al. | |
| 2013/0030920 A1 | 1/2013 | Wu et al. | |
| 2013/0031318 A1 | 1/2013 | Chen et al. | |
| 2013/0033203 A1 | 2/2013 | Luke et al. | |
| 2013/0046457 A1 | 2/2013 | Pettersson | |
| 2013/0074411 A1 | 3/2013 | Ferguson et al. | |
| 2013/0090795 A1 | 4/2013 | Luke et al. | |
| 2013/0093271 A1 | 4/2013 | Luke et al. | |
| 2013/0093368 A1 | 4/2013 | Luke et al. | |
| 2013/0093384 A1 | 4/2013 | Nyu et al. | |
| 2013/0116892 A1 | 5/2013 | Wu et al. | |
| 2013/0119898 A1 | 5/2013 | Ohkura | |
| 2013/0127416 A1 | 5/2013 | Karner et al. | |
| 2013/0132307 A1 | 5/2013 | Phelps et al. | |

(56) References Cited

U.S. PATENT DOCUMENTS

| | | |
|---|---|---|
| 2013/0181582 A1 | 7/2013 | Luke et al. |
| 2013/0200845 A1 | 8/2013 | Bito |
| 2013/0254097 A1 | 9/2013 | Marathe et al. |
| 2013/0282254 A1 | 10/2013 | Dwan et al. |

FOREIGN PATENT DOCUMENTS

| | | | |
|---|---|---|---|
| EP | 2 230 146 A2 | | 9/2010 |
| EP | 2 428 939 A1 | | 3/2012 |
| JP | 07-031008 | A | 1/1995 |
| JP | 7-36504 | U | 7/1995 |
| JP | 9-119839 | A | 5/1997 |
| JP | 10-170293 | A | 6/1998 |
| JP | 10-307952 | A | 11/1998 |
| JP | 11-049079 | | 2/1999 |
| JP | 11-51681 | A | 2/1999 |
| JP | 11-176487 | A | 7/1999 |
| JP | 11-205914 | A | 7/1999 |
| JP | 2000-102102 | A | 4/2000 |
| JP | 2000-102103 | A | 4/2000 |
| JP | 2000-341868 | A | 12/2000 |
| JP | 2001-128301 | | 5/2001 |
| JP | 2003-118397 | | 4/2003 |
| JP | 2003-262525 | A | 9/2003 |
| JP | 2005-67453 | A | 3/2005 |
| JP | 2006-121874 | A | 5/2006 |
| JP | 2009-171646 | A | 7/2009 |
| JP | 2009-171647 | A | 7/2009 |
| JP | 4319289 | B2 | 8/2009 |
| JP | 2010-022148 | A | 1/2010 |
| JP | 2010-191636 | A | 9/2010 |
| JP | 2010-200405 | A | 9/2010 |
| JP | 2010-269686 | A | 12/2010 |
| JP | 2011-126452 | | 6/2011 |
| JP | 2011-131631 | A | 7/2011 |
| JP | 2011/142704 | A | 7/2011 |
| JP | 2012-151916 | A | 8/2012 |
| KR | 1998-045020 | U | 9/1998 |
| KR | 2004-0005146 | A | 1/2004 |
| KR | 20100012401 | A | 2/2010 |
| KR | 10-0971278 | B1 | 7/2010 |
| KR | 20110004292 | A | 1/2011 |
| KR | 20110041783 | A | 4/2011 |
| KR | 20120020554 | A | 3/2012 |
| TW | 200836452 | A | 9/2008 |
| TW | I315116 | B | 9/2009 |
| TW | M371880 | U1 | 1/2010 |
| TW | M379269 | U1 | 4/2010 |
| TW | M379789 | U1 | 5/2010 |
| TW | M385047 | U1 | 7/2010 |
| TW | 201043986 | A1 | 12/2010 |
| TW | 201044266 | A1 | 12/2010 |
| WO | 98/21132 | A1 | 5/1998 |
| WO | 2009/039454 | A1 | 3/2009 |
| WO | 2010/033517 | A2 | 3/2010 |
| WO | 2010/143483 | A1 | 12/2010 |
| WO | 2011/138205 | A1 | 11/2011 |
| WO | 2012/085992 | A1 | 6/2012 |
| WO | 2012/160407 | A1 | 11/2012 |
| WO | 2012/160557 | A2 | 11/2012 |
| WO | 2013/024483 | A2 | 2/2013 |
| WO | 2013/024484 | A1 | 2/2013 |
| WO | 2013/074819 | A1 | 5/2013 |
| WO | 2013/080211 | A1 | 6/2013 |
| WO | 2013/102894 | A1 | 7/2013 |
| WO | 2013/108246 | A2 | 7/2013 |
| WO | 2013/118113 | A2 | 8/2013 |
| WO | 2013/142154 | A1 | 9/2013 |
| WO | 2013/144951 | A1 | 10/2013 |

OTHER PUBLICATIONS

"Outrunner," retreived from URL=http://en.wikipedia.org/w/index.php?title=Outrunner&printable=yes on Sep. 16, 2011, 2 pages.

Chen et al., "Adjusting Electric Vehicle Systems Based on an Electrical Energy Storage Device Thermal Profile," U.S. Appl. No. 61/862,854, filed Aug. 6, 2013, 74 pages.

Chen et al., "Apparatus, System, and Method for Authentication of Vehicular Components," Notice of Allowance mailed Mar. 25, 2014, for U.S. Appl. No. 13/918,703, 7 pages.

Chen et al., "Systems and Methods for Powering Electric Vehicles Using a Single or Multiple Power Cells," U.S. Appl. No. 61/862,852, filed Aug. 6, 2013, 46 pages.

Communication pursuant to Rules 161(2) and 162 EPC, for corresponding European Patent Application No. 12817273.1, dated Mar. 25, 2014, 3 pages.

Communication pursuant to Rules 161(2) and 162 EPC, for corresponding European Patent Application No. 12817141.0, dated Mar. 26, 2014, 3 pages.

Communication pursuant to Rules 161(2) and 162 EPC, for corresponding European Patent Application No. 12818308.4, dated Mar. 26, 2014, 3 pages.

Communication pursuant to Rules 161(2) and 162 EPC, for corresponding European Patent Application No. 12817696.3, dated Mar. 27, 2014, 3 pages.

Communication pursuant to Rules 161(2) and 162 EPC, for corresponding European Patent Application No. 12817883.7, dated Mar. 27, 2014, 3 pages.

Communication pursuant to Rules 161(2) and 162 EPC, for corresponding European Patent Application No. 12818447.0, dated Mar. 27, 2014, 3 pages.

International Preliminary Report on Patentability and Written Opinion for corresponding International Patent Application No. PCT/US2012/048349, issued on Jan. 28, 2014, 5 pages.

International Preliminary Report on Patentability and Written Opinion for corresponding International Patent Application No. PCT/US2012/048354, issued on Jan. 28, 2014, 7 pages.

International Preliminary Report on Patentability and Written Opinion for corresponding International Patent Application No. PCT/US2012/048358, issued on Jan. 28, 2014, 5 pages.

International Preliminary Report on Patentability and Written Opinion for corresponding International Patent Application No. PCT/US2012/048366, issued on Jan. 28, 2014, 5 pages.

International Preliminary Report on Patentability and Written Opinion for corresponding International Patent Application No. PCT/US2012/048367, issued on Jan. 28, 2014, 4 pages.

International Preliminary Report on Patentability and Written Opinion for corresponding International Patent Application No. PCT/US2012/048375, issued on Jan. 28, 2014, 5 pages.

International Preliminary Report on Patentability and Written Opinion for corresponding International Patent Application No. PCT/US2012/048379, issued on Jan. 28, 2014, 5 pages.

International Preliminary Report on Patentability and Written Opinion for corresponding International Patent Application No. PCT/US2012/048380, issued on Jan. 28, 2014, 5 pages.

International Preliminary Report on Patentability and Written Opinion for corresponding International Patent Application No. PCT/US2012/048382, issued on Jan. 28, 2014, 5 pages.

International Preliminary Report on Patentability and Written Opinion for corresponding International Patent Application No. PCT/US2012/048391, issued on Jan. 28, 2014, 6 pages.

International Search Report and Written Opinion for corresponding International Patent Application No. PCT/US2012/048344, mailed Feb. 28, 2013, 9 pages.

International Search Report and Written Opinion for corresponding International Application No. PCT/US2012/058930, mailed Mar. 15, 2013, 11 pages.

International Search Report and Written Opinion for corresponding International Application No. PCT/US2013/070131, mailed Feb. 19, 2014, 17 pages.

International Search Report and Written Opinion for corresponding International Application No. PCT/US2013/065704, mailed Feb. 13, 2014, 13 pages.

International Search Report and Written Opinion for corresponding International Application No. PCT/US2012/059931, mailed Mar. 29, 2013, 13 pages.

Luke et al., "Electric Device Drive Assembly and Cooling System," U.S. Appl. No. 61/615,144, filed Mar. 23, 2012, 43 pages.

(56) References Cited

OTHER PUBLICATIONS

Luke et al. "Modular System for Collection and Distribution of Electric Storage Devices," U.S. Appl. No. 14/202,589, filed Mar. 10, 2014, 76 pages.
Luke et al., "Apparatus, Method and Article for Authentication, Security and Control of Power Storage Devices, Such As Batteries," Office Action mailed Feb. 26, 2014, for U.S. Appl. No. 13/559,038, 13 pages.
Luke et al., "Apparatus, Method and Article for Authentication, Security and Control of Power Storage Devices, Such As Batteries," Office Action mailed Feb. 25, 2014, for U.S. Appl. No. 14/023,344, 12 pages.
Luke et al., "Dynamically Limiting Vehicle Operation for Best Effort Economy," Office Action for U.S. Appl. No. 13/559,264, mailed Feb. 12, 2014, 24 pages.
Luke et al., "Thermal Management of Components in Electric Motor Drive Vehicles," Office Action mailed Apr. 2, 2014, for U.S. Appl. No. 13/559,259, 11 pages.
Luke, "Apparatus, Method and Article for Changing Portable Electrical Power Storage Device Exchange Plans," U.S. Appl. No. 14/204,587, filed Mar. 11, 2014, 56 pages.
Microchip, "AN885: Brushless DC (BLDC) Motor Fundamentals," Microchip Technology Inc., 2003, 19 pages.
Taylor et al., "Apparatus, Method and Article for Providing Vehicle Event Data," U.S. Appl. No. 61/901,660, filed Nov. 8, 2013, 58 pages.
Wu et al., "Apparatus, Method and Article for a Power Storage Device Compartment," Office Action for U.S. Appl. No. 13/559,125, mailed Feb. 24, 2014, 28 pages.
Wu et al., "Apparatus, Method and Article for Providing Information Regarding Availability of Power Storage Devices At a Power Storage Device Collection, Charging and Distribution Machine," Office Action mailed Mar. 5, 2014, for U.S. Appl. No. 14/022,140, 8 pages.
Wu et al., "Apparatus, Method and Article for Providing Locations of Power Storage Device Collection, Charging and Distribution Machines," Office Action mailed Mar. 5, 2014, for U.S. Appl. No. 14/022,147, 12 pages.
Chen et al., "Apparatus, System, and Method for Authentication of Vehicular Components," U.S. Appl. No. 13/918,703, filed Jun. 14, 2013, 84 pages.
Chen et al., "Apparatus, System, and Method for Authentication of Vehicular Components ," U.S. Appl. No. 61/783,041, filed Mar. 14, 2013, 84 pages.
Chen et al., "Apparatus, System, and Method for Authentication of Vehicular Components," Office Action mailed Nov. 22, 2013, for U.S. Appl. No. 13/918,703, 35 pages.
Chen et al., "Apparatus, Method and Article for Providing Vehicle Diagnostic Data," U.S. Appl. No. 14/022,134, filed Sep. 9, 2013, 61 pages.
Chen et al., "Apparatus, Method and Article for Providing Vehicle Diagnostic Data," Office Action mailed Dec. 30, 2013, for U.S. Appl. No. 14/022,134, 20 pages.
Chen et al., "Apparatus, Method and Article for Providing Vehicle Diagnostic Data," U.S. Appl. No. 61/601,404, filed Feb. 21, 2012, 56 pages.
Huang et al., "Apparatus, Method and Article for Vehicle Turn Signals," U.S. Appl. No. 61/727,403, filed Nov. 16, 2012, 41 pages.
Huang et al., "Apparatus, Method and Article for Vehicle Turn Signals," U.S. Appl. No. 14/079,894, filed Nov. 14, 2013, 41 pages.
International Search Report and Written Opinion for corresponding European Patent Application No. PCT/US2012/048379, mailed Dec. 17, 2012, 9 pages.
International Search Report and Written Opinion for corresponding International Patent Application No. PCT/US2012/048380, mailed Feb. 27, 2013, 9 pages.
International Search Report and Written Opinion for corresponding International Patent Application No. PCT/US2012/048382, mailed Feb. 27, 2013, 9 pages.
International Search Report and Written Opinion for corresponding International Patent Application No. PCT/US2012/063979, mailed Mar. 4, 2013, 10 pages.
International Search Report and Written Opinion for corresponding International Patent Application No. PCT/US2012/048347, mailed Dec. 18, 2012, 8 pages.
International Search Report and Written Opinion for corresponding International Patent Application No. PCT/US2012/048349, mailed Feb. 18, 2013, 9 pages.
International Search Report and Written Opinion for corresponding International Patent Application No. PCT/US2012/048354, mailed Feb. 18, 2013, 11 pages.
International Search Report and Written Opinion for corresponding International Patent Application No. PCT/US2012/048358, mailed Feb. 25, 2013, 9 pages.
International Search Report and Written Opinion for corresponding International Patent Application No. PCT/US2012/048366, mailed Jan. 21, 2013, 10 pages.
International Search Report and Written Opinion for corresponding International Patent Application No. PCT/US2012/048367, mailed Jan. 17, 2013, 8 pages.
International Search Report and Written Opinion for corresponding International Patent Application No. PCT/US2012/048375, mailed Jan. 23, 2013, 9 pages.
International Search Report and Written Opinion for corresponding International Patent Application No. PCT/US2012/048379, mailed Dec. 17, 2012, 9 pages.
International Search Report and Written Opinion for corresponding International Application No. PCT/US2012/048391, mailed Dec. 21, 2012, 9 pages.
Luke et al., "Portable Electrical Energy Storage Device," U.S. Appl. No. 61/872,126, filed Aug. 30, 2013, 39 pages.
Luke et al., "Apparatus, Method and Article for Authentication, Security and Control of Portable Charging Devices and Power Storage Devices, Such As Batteries," U.S. Appl. No. 14/017,090, filed Sep. 3, 2013, 69 pages.
Luke et al., "Apparatus, Method and Article for Authentication, Security and Control of Portable Charging Devices and Power Storage Devices, Such As Batteries," U.S. Appl. No. 61/773,621, filed Mar. 6, 2013, 69 pages.
Luke et al., "Apparatus, Method and Article for Authentication, Security and Control of Portable Charging Devices and Power Storage Devices, Such As Batteries," Office Action mailed Jan. 6, 2014, for U.S. Appl. No. 14/017,090, 19 pages.
Luke et al., "Apparatus, Method and Article for Providing Targeted Advertising in a Rechargeable Electrical Power Storage Device Distribution Environment," U.S. Appl. No. 61/773,614, filed Mar. 6, 2013, 77 pages.
Luke et al., "Detectible Indication of an Electric Motor Vehicle Standby Mode," U.S. Appl. No. 61/543,720, filed Oct. 5, 2011, 35 pages.
Luke et al., "Detectible Indication of an Electric Motor Vehicle Standby Mode," U.S. Appl. No. 61/684,432, filed Aug. 17, 2012, 41 pages.
Luke et al., "Detectible Indication of an Electric Motor Vehicle Standby Mode," Office Action for U.S. Appl. No. 13/646,320, mailed May 30, 2013, 13 pages.
Luke et al., "Drive Assembly for Electric Powered Device," U.S. Appl. No. 61/546,411, filed Oct. 12, 2011, 18 pages.
Luke et al., "Modular System for Collection and Distribution of Electric Storage Devices," U.S. Appl. No. 61/789,065, filed Mar. 15, 2013, 76 pages.
Luke et al., "Apparatus, Method and Article for Authentication, Security and Control of Power Storage Devices, Such As Batteries," U.S. Appl. No. 61/534,761, filed Sep. 14, 2011, 55 pages.
Luke et al., "Apparatus, Method and Article for Authentication, Security and Control of Power Storage Devices, Such As Batteries, Based on User Profiles," U.S. Appl. No. 61/534,772, filed Sep. 14, 2011, 55 pages.
Luke et al., "Apparatus, Method and Article for Authentication, Security and Control of Power Storage Devices, Such As Batteries," U.S. Appl. No. 14/023,344, filed Sep. 10, 2013, 59 pages.
Luke et al., "Apparatus, Method and Article for Collection, Charging and Distributing Power Storage Devices, Such As Batteries," U.S. Appl. No. 61/511,900, filed Jul. 26, 2011, 73 pages.

(56) References Cited

OTHER PUBLICATIONS

Luke et al., "Apparatus, Method and Article for Collection, Charging and Distributing Power Storage Devices, Such As Batteries," U.S. Appl. No. 61/647,936, filed May 16, 2012, 76 pages.

Luke et al., "Apparatus, Method and Article for Redistributing Power Storage Devices, Such As Batteries, Between Collection, Charging and Distribution Machines," U.S. Appl. No. 61/534,753, filed Sep. 14, 2011, 65 pages.

Luke et al., "Apparatus, Method and Article for Redistributing Power Storage Devices, Such As Batteries, Between Collection Charging and Distribution Machines," U.S. Appl. No. 13/559,091, filed Jul. 26, 2012, 69 pages.

Luke et al., "Detectible Indication of an Electric Motor Vehicle Standby Mode," U.S. Appl. No. 13/646,320, filed Oct. 5, 2012, 41 pages.

Luke et al., "Dynamically Limiting Vehicle Operation for Best Effort Economy," U.S. Appl. No. 61/511,880, filed Jul. 26, 2011, 52 pages.

Luke et al., "Dynamically Limiting Vehicle Operation for Best Effort Economy," Office Action for U.S. Appl. No. 13/559,264, mailed Aug. 14, 2013, 21 pages.

Luke et al., "Thermal Management of Components in Electric Motor Drive Vehicles," U.S. Appl. No. 61/647,941, filed May 16, 2012, 47 pages.

Luke et al., "Thermal Management of Components in Electric Motor Drive Vehicles," U.S. Appl. No. 61/511,887, filed Jul. 26, 2011, 44 pages.

Luke, "Apparatus, Method and Article for Changing Portable Electrical Power Storage Device Exchange Plans," U.S. Appl. No. 61/778,038, filed Mar. 12, 2013, 56 pages.

Luke, "Apparatus, Method and Article for Providing Information Regarding a Vehicle Via a Mobile Device," U.S. Appl. No. 14/017,081, filed Sep. 3, 2013, 81 pages.

Luke, "Apparatus, Method and Article for Providing Information Regarding a Vehicle Via a Mobile Device," Office Action for U.S. Appl. No. 14/017,081, mailed Jan. 30, 2014, 36 pages.

Luke, "Apparatus, Method and Article for Providing Information Regarding a Vehicle Via a Mobile Device," U.S. Appl. No. 61/780,781, filed Mar. 13, 2013, 80 pages.

Taylor et al., "Apparatus, Method and Article for Physical Security of Power Storage Devices in Vehicles," U.S. Appl. No. 61/557,170, filed Nov. 8, 2011, 60 pages.

Taylor et al., "Apparatus, Method and Article for Physical Security of Power Storage Devices in Vehicles," Notice of Allowance for U.S. Appl. No. 13/559,054, mailed May 30, 2013, 32 pages.

Taylor et al., "Apparatus, Method and Article for Physical Security of Power Storage Devices in Vehicles," Office Action for U.S. Appl. No. 13/559,054, mailed Dec. 3, 2012, 11 pages.

Taylor et al., "Apparatus, Method and Article for Physical Security of Power Storage Devices in Vehicles," U.S. Appl. No. 14/012,845, filed Aug. 28, 2013, 64 pages.

Wu et al., "Battery Configuration for an Electric Vehicle," U.S. Appl. No. 61/716,388, filed Oct. 19, 2012, 37 pages.

Wu et al., "Apparatus, Method and Article for a Power Storage Device Compartment," U.S. Appl. No. 61/581,566, filed Dec. 29, 2011, 61 pages.

Wu et al., "Apparatus, Method and Article for Providing Information Regarding Availability of Power Storage Devices At a Power Storage Device Collection, Charging and Distribution Machine," U.S. Appl. No. 61/601,953, filed Feb. 22, 2012, 53 pages.

Wu et al., "Apparatus, Method and Article for Providing Information Regarding Availability of Power Storage Devices At a Power Storage Device Collection, Charging and Distribution Machine," U.S. Appl. No. 14/022,140, filed Sep. 9, 2013, 56 pages.

Wu et al., "Apparatus, Method and Article for Providing Locations of Power Storage Device Collection, Charging and Distribution Machines," U.S. Appl. No. 61/601,949, filed Feb. 22, 2012, 56 pages.

Wu et al., "Apparatus, Method and Article for Providing Locations of Power Storage Device Collection, Charging and Distribution Machines," Office Action for U.S. Appl. No. 13/559,333, mailed Jul. 3, 2013, 14 pages.

Wu et al., "Apparatus, Method and Article for Providing Locations of Power Storage Device Collection, Charging and Distribution Machines," U.S. Appl. No. 14/022,147, filed Sep. 9, 2013, 56 pages.

Wu et al., "Apparatus, Method and Article for Providing Locations of Power Storage Device Collection, Charging and Distribution Machines," Office Action mailed Nov. 19, 2013, for U.S. Appl. No. 14/022,147, 10 pages.

Wu et al., "Apparatus, Method and Article for Providing Locations of Power Storage Device Collection, Charging and Distribution Machines," Office Action mailed Nov. 27, 2013, for U.S. Appl. No. 13/559,333, 19 pages.

Wu et al., "Apparatus, Method and Article for Security of Vehicles," U.S. Appl. No. 61/557,176, filed Nov. 8, 2011, 37 pages.

Wu, "Battery Configuration for an Electric Vehicle," U.S. Appl. No. 14/057,405, filed Oct. 18, 2013, 38 pages.

\* cited by examiner

APPARATUS, METHOD AND ARTICLE FOR POWER STORAGE DEVICE FAILURE SAFETY

BACKGROUND

1. Technical Field

The present disclosure generally relates to power storage device failure, and particularly to power storage device failure in vehicles.

2. Description of the Related Art

There are a wide variety of uses or applications for portable electrical energy storage devices.

One such application is in the field of transportation. Hybrid and all-electric vehicles are becoming increasingly common. Such vehicles may achieve a number of advantages over traditional internal combustion engine vehicles. For example, hybrid or electrical vehicles may achieve higher fuel economy and may have little or even zero tail pipe pollution. In particular, all-electric vehicles may not only have zero tail pipe pollution, but may be associated with lower overall pollution. For example, electrical power may be generated from renewable sources (e.g., solar, hydro). Also, for example, electrical power may be generated at generation plants that produce no air pollution (e.g., nuclear plants). Also, for example, electrical power may be generated at generation plants that burn relatively "clean burning" fuels (e.g., natural gas), which have higher efficiency than internal combustion engines, and/or which employ pollution control or removal systems (e.g., industrial air scrubbers) which are too large, costly or expensive for use with individual vehicles.

Personal transportation vehicles such as combustion engine powered scooters and/or motorbikes are ubiquitous in many places, for example, in the many large cities of Asia. Such scooters and/or motorbikes tend to be relatively inexpensive, particularly as compared to automobiles, cars or trucks. Cities with high numbers of combustion engine scooters and/or motorbikes also tend to be very densely populated and suffer from high levels of air pollution. When new, many combustion engine scooters and/or motorbikes provide a relatively low polluting source of personal transportation. For instance, such scooters and/or motorbikes may have higher mileage ratings than larger vehicles. Some scooters and/or motorbikes may even be equipped with basic pollution control equipment (e.g., catalytic converter). Unfortunately, factory specified levels of emission are quickly exceeded if the scooters and/or motorbikes are used and not maintained and/or if the scooters and/or motorbikes are modified, for example, by intentional or unintentional removal of catalytic converters. Often owners or operators of scooters and/or motorbikes lack the financial resources or the motivation to maintain their vehicles.

It is known that air pollution has a negative effect on human health, being associated with causing or exacerbating various diseases (e.g., various reports tie air pollution to emphysema, asthma, pneumonia, and cystic fibrosis, as well as to various cardiovascular diseases). Such diseases take large numbers of lives and severely reduce the quality of life of countless others.

BRIEF SUMMARY

A portable electrical energy storage device compartment system may be summarized as including at least one controller; and at least one communications module coupled to the at least one controller, wherein the at least one controller: receives information via the at least one communications module regarding an unsafe condition of a portable electrical energy storage device in a compartment configured to hold the portable electrical energy storage device; and in response to receiving the information regarding the unsafe condition: determines whether the portable electrical energy storage device is in a desired state to have the compartment locked; and if it is determined the portable electrical energy storage device is in the desired state to have the compartment locked, then locks a portable electrical energy storage device compartment locking mechanism of the compartment to protect a user against the unsafe condition. The desired state to have the compartment locked may be a state in which one or more of a temperature level, a voltage level and a current level of a circuit to which the portable electrical energy storage device is connected is above a particular respective threshold. The unsafe condition may be a potential or existing catastrophic failure of the portable electrical energy storage device in the compartment. The desired state to have the compartment locked may be a state in which one or more of a temperature level of the portable electrical energy storage device and a temperature level of an inside of the compartment is above a particular respective threshold. The at least one communications module may receive the information regarding the unsafe condition from one or more sensors coupled to a circuit to which the portable electrical energy storage device is connected and may communicate the information to the at least one controller to enable the at least one controller to lock the portable electrical energy storage device compartment locking mechanism.

The portable electrical energy storage device compartment system may further include the portable electrical energy storage device compartment locking mechanism coupled to the at least one controller; and one or more sensors coupled to the at least one controller that sense conditions indicative of the unsafe condition, the conditions indicative of the unsafe condition including conditions regarding one or more of: a temperature level of a circuit to which the portable electrical energy storage device is connected, a voltage level of a circuit to which the portable electrical energy storage device is connected, a current level of a circuit to which the portable electrical energy storage device is connected, a temperature of the portable electrical energy storage device, a temperature of an inside of the compartment in which the portable electrical energy storage device is located, and a short circuit of a circuit to which the portable electrical energy storage device is connected, wherein the at least one controller sends a control signal in a manner to lock the portable electrical energy storage device compartment locking mechanism if the controller determines the portable electrical energy storage device is in the desired state to have the compartment locked based on the conditions indicative of the unsafe conditions sensed by the one or more sensors.

The at least one controller may further be configured to make a determination regarding unlocking the portable electrical energy storage device based on one or more of: information regarding the unsafe condition no longer being present and performance of a locking mechanism override operation. The configured portable electrical energy storage device compartment system may be coupled to a vehicle. The configured portable electrical energy storage device compartment system may be coupled to a collection, charging and distribution machine. The at least one controller may send the information regarding information regarding an unsafe condition to an external device via a wireless signal transmitted to the external device.

The portable electrical energy storage device compartment system may further include a power source, separate from the portable electrical energy storage device, coupled to the at least one controller and the portable electrical energy storage device compartment locking mechanism to provide power to the portable electrical energy storage device compartment locking mechanism and the at least one controller.

A method of operating a portable electrical energy storage device compartment system may be summarized as including receiving, by the portable electrical energy storage device compartment system, information regarding an unsafe condition of a portable electrical energy storage device in a compartment configured to hold the portable electrical energy storage device; and making a determination, by the portable electrical energy storage device compartment system, regarding locking a portable electrical energy storage device compartment locking mechanism based on the information regarding the unsafe condition of the portable electrical energy storage device in the compartment.

The method may further include receiving, by a communications module of the portable electrical energy storage device compartment system, the information regarding the unsafe condition from one or more sensors coupled to a circuit to which the portable electrical energy storage device is connected; and communicating, by a communications module of the portable electrical energy storage device compartment system, the information to at least one controller of the portable electrical energy storage device compartment system to enable the at least one controller to lock the portable electrical energy storage device compartment locking mechanism. The received information regarding the unsafe condition may include information regarding one or more of: a temperature level of a circuit to which the portable electrical energy storage device is connected, a voltage level of a circuit to which the portable electrical energy storage device is connected, a current level of a circuit to which the portable electrical energy storage device is connected, a temperature of the portable electrical energy storage device, and a temperature of an inside of the compartment in which the portable electrical energy storage device is located.

A vehicle may be summarized as including a motor to propel the vehicle at least partially powered by a portable electrical energy storage device; an electronic control unit coupled to the portable electrical energy storage device that controls how much power to draw from the portable electrical energy storage device to power the motor; a compartment configured to hold the portable electrical energy storage device; at least one controller of a locking mechanism of the compartment; and at least one communications module coupled to the at least one controller, wherein the at least one controller: receives information via the at least one communications module regarding an unsafe condition of a portable electrical energy storage device in the compartment; and in response to receiving the information regarding the unsafe condition: determines whether the portable electrical energy storage device is in a desired state to have the compartment locked; and if it is determined the portable electrical energy storage device is in the desired state to have the compartment locked, then locks a portable electrical energy storage device compartment locking mechanism of the compartment to protect a user against the unsafe condition. The at least one controller: in response to receiving the information regarding the unsafe condition, may send a signal to the electronic control unit to reduce or eliminate a current power draw from a portable electrical energy storage device in the compartment. The information regarding the unsafe condition may be indicative of an unsafe current level of a circuit to which the portable electrical energy storage device and electronic control unit are connected.

A portable electrical energy storage device may be summarized as including at least one portable electrical energy storage device cell; and one or more sensors coupled to the at least one portable electrical energy storage device cell and to at least one controller, wherein the one or more sensors sense conditions indicative of an unsafe condition of the portable electrical energy storage device, the conditions indicative of the unsafe condition including conditions regarding one or more of: a temperature level of a circuit to which the portable electrical energy storage device is connected, a voltage level of a circuit to which the portable electrical energy storage device is connected, a current level of a circuit to which the portable electrical energy storage device is connected, a temperature of the portable electrical energy storage device, a temperature of an inside of a compartment in which the portable electrical energy storage device is located, and a short circuit of a circuit to which the portable electrical energy storage device is connected.

The portable electrical energy storage device may further include at least one communications module coupled to the to at least one controller, wherein the at least one communications module communicates information regarding the conditions indicative of an unsafe condition to the at least one controller; and the at least one controller, in response to receiving the information regarding the unsafe condition: determines whether a portable electrical energy storage device is in a desired state to have the compartment locked; and if it is determined the portable electrical energy storage device is in the desired state to have the compartment locked, then sends a signal to active a portable electrical energy storage device compartment locking mechanism. The at least one communications module may communicate information regarding the conditions indicative of an unsafe condition to an external device. The at least one communications module wirelessly may communicate information regarding the conditions indicative of an unsafe condition to the external device.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements may be enlarged and positioned to improve drawing legibility. Further, the particular shapes of the elements as drawn are not intended to convey any information regarding the actual shape of the particular elements, and have been solely selected for ease of recognition in the drawings.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with vending apparatus, batteries, locking mechanisms, wireless technologies, supercapacitors or ultracapacitors, temperature sensors, voltmeters, ammeters, multimeters, and power converters including but not limited to transformers, rectifiers, DC/DC power converters, switch mode power converters, controllers, and communications systems and structures and networks have not been shown or described in detail to avoid unnecessarily obscuring descriptions of the embodiments.

Unless the context requires otherwise, throughout the specification and claims which follow, the word "comprise" and variations thereof, such as "comprises" and "comprising" are to be construed in an open, inclusive sense that is as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment.

The use of ordinals such as first, second and third does not necessarily imply a ranked sense of order, but rather may only distinguish between multiple instances of an act or structure.

Reference to portable electrical energy storage devices means any device capable of storing electrical power and releasing stored electrical power including but not limited to batteries, supercapacitors or ultracapacitors. Reference to batteries means chemical storage cell or cells, for instance rechargeable or secondary battery cells including but not limited to nickel cadmium alloy or lithium ion battery cells.

The headings and Abstract of the Disclosure provided herein are for convenience only and do not interpret the scope or meaning of the embodiments.

Figure 1:
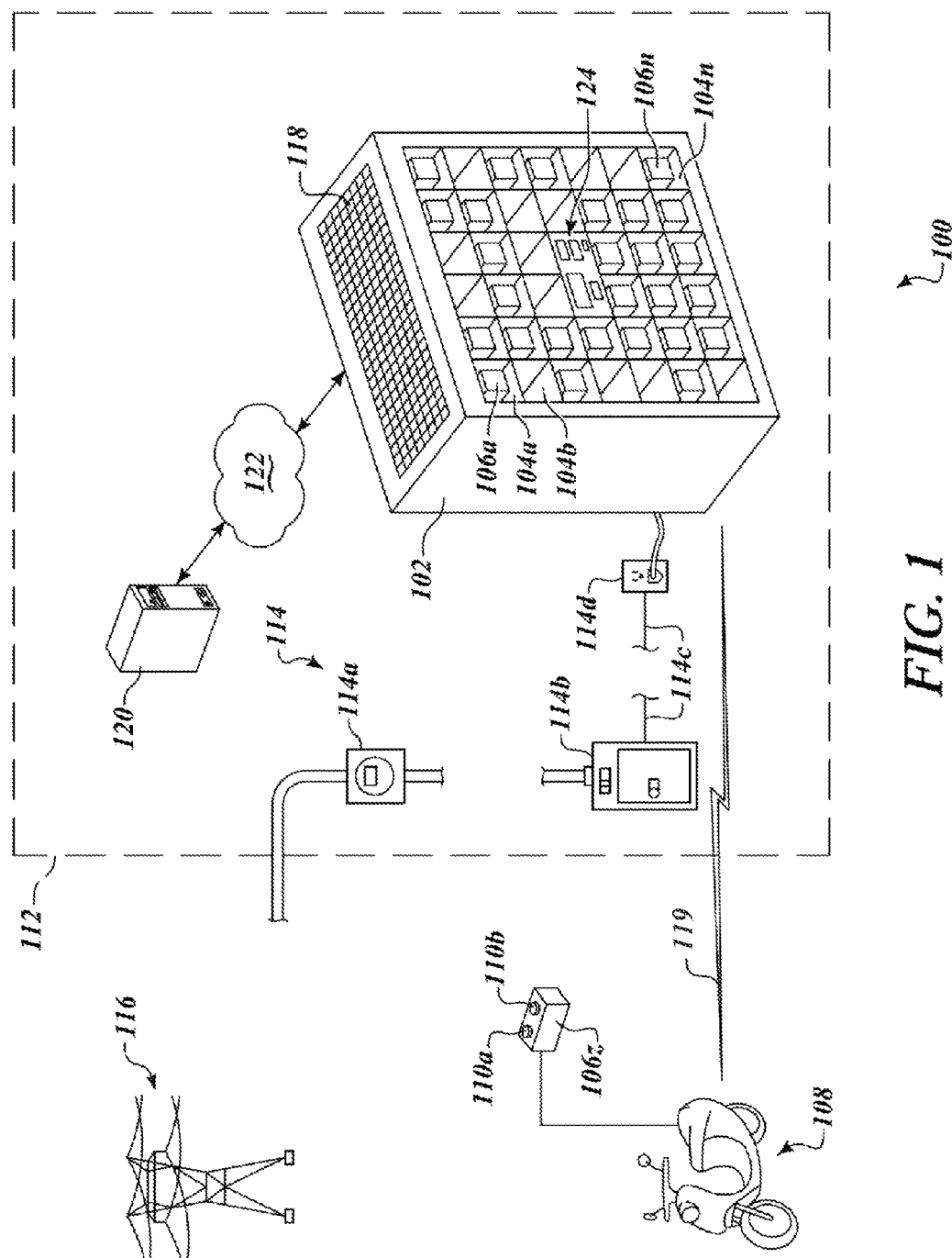
FIG. 1 is a schematic view of a collection, charging and distribution machine along with a number of electrical power storage devices according to one non-limiting illustrated embodiment, along with an electric scooter or motorbike having an electrical power storage device compartment, and an electrical service provided via an electrical grid, according to one non-limiting illustrated embodiment.

FIG. 1 shows an environment 100 including a collection, charging and distribution machine 102, according to one illustrated embodiment.

The collection, charging and distribution machine 102 may take the form of a vending machine or kiosk. The collection, charging and distribution machine 102 has a plurality of receivers, compartments or receptacles 104a, 104b-104n (only three called out in FIG. 1, collectively 104) to removably receive portable electrical energy storage devices (e.g., batteries, supercapacitors or ultracapacitors) 106a-106n (collectively 106) for collection, charging and distribution. As illustrated in FIG. 1, some of the receivers 104 are empty, while other receivers 104 hold portable electrical energy storage devices 106. While FIG. 1 shows a single portable electrical energy storage device 106 per receiver 104, in some embodiments each receiver 104 may hold two or even more portable electrical energy storage devices 106. For example, each of the receivers 104 may be sufficiently deep to receive three portable electrical energy storage devices 106. Thus, for example, the collection, charging and distribution machine 102 illustrated in FIG. 1 may have a capacity capable of simultaneously holding 40, 80 or 120 portable electrical energy storage devices 106.

The portable electrical energy storage devices 106 may take a variety of forms, for example, batteries (e.g., array of battery cells) or supercapacitors or ultracapacitors (e.g., array of ultracapacitor cells). For example, the portable electrical energy storage device 106z may take the form of rechargeable batteries (i.e., secondary cells or batteries). The portable electrical energy storage device 106z may, for instance, be sized to physically fit and electrically power personal transportation vehicles, such as all-electric scooters or motorbikes 108, and may also be sized to physically fit in a portable electrical energy storage device compartment of the all-electric scooters or motorbikes 108. As previously noted, combustion engine scooters and motorbikes are common in many large cities, for example, in Asia, Europe and the Middle East. The ability to conveniently access charged batteries throughout a city or region may facilitate the use of all-electric scooters and motorbikes 108 in place of combustion engine scooters and motorbikes, thereby alleviating air pollution, as well as reducing noise.

The portable electrical energy storage devices 106 (only visible for portable electrical energy storage device 106z) may include a number of electrical terminals 110a, 110b (two illustrated, collectively 110), accessible from an exterior of the portable electrical energy storage device 106z and also may be accessible when the portable electrical energy storage device 106z is in a portable electrical energy storage device compartment of the all-electric scooters or motorbikes 108. The electrical terminals 110 allow charge to be delivered from the portable electrical energy storage device 106z, as well as allow charge to be delivered to the portable electrical energy storage device 106z for charging or recharging the same.

While illustrated in FIG. 1 as posts, the electrical terminals 110 may take any other form which is accessible from an exterior of the portable electrical energy storage device 106z and a portable electrical energy storage device compartment, including electrical terminals positioned within slots in a housing of a battery and a battery compartment.

As the portable electrical energy storage devices 106 may encounter unsafe conditions while being used in a vehicle or when being charged or stored in the collection, charging and distribution machine 102, it may be desirable to lock a compartment in which the portable electrical energy storage devices 106 is currently being held when such conditions occur. Such unsafe conditions may be caused by overheating, melting or explosion caused by a short circuit, system malfunction, environmental conditions or other catastrophic failure. Locking the compartment in which the portable electrical energy storage device is currently being held when such conditions occur may be performed as a safety measure that helps contain the unsafe condition inside the compartment or prevents injury to a user attempting to access the portable electrical energy storage device when such conditions are present or are imminent. Systems and methods for the operation of a portable electrical energy storage device compartment, including systems for controlling when the portable electrical energy storage device compartment is to be automatically locked or unlocked, are described in more detail below with reference to FIGS. 3A-10, and are useful in the overall system for collection, charging and distribution of the portable electrical energy storage devices 106 described herein.

The collection, charging and distribution machine 102 is positioned at some location 112 at which the collection, charging and distribution machine 102 is conveniently and easily accessible by various end users. The location may take any of a large variety of forms, for example, a retail environment such as a convenience store, supermarket, gas or petrol station, or service center. Alternatively, the collection, charging and distribution machine 102 may stand alone at a location 112 not associated with an existing retail or other business, for example in public parks or other public places. Thus, for example, collection, charging and distribution machines 102 may be located at each store of a chain of convenience stores throughout a city or region. Such may advantageously rely on the fact that convenience stores are often sited or distributed based on convenience to the target population or demographic. Such may advantageously rely on pre-existing leases on storefronts or other retail locations to allow an extensive network of collection, charging and distribution machines 102 to be quickly developed in a city or region. Quickly achieving a large network that provides for convenient replacement and security of the portable electrical energy storage devices 106 used in the all-electric scooters or motorbikes 108 enhances the ability to depend on such a system and likely commercial success of such an effort.

The location 112 may include an electrical service 114 to receive electrical power from a generating station (not shown) for example via a grid 116. The electrical service 114 may, for example, include one or more of an electrical service meter 114a, a circuit panel (e.g., circuit breaker panel or fuse box) 114b, wiring 114c, and electrical outlet 114d. Where the location 112 is an existing retail or convenience store, the electrical service 114 may be an existing electrical service, so may be somewhat limited in rating (e.g., 120 volts, 240 volts, 220 volts, 230 volts, 15 amps).

Optionally, the collection, charging and distribution machine 102 may include or be coupled to a source of renewable electrical power. For example, where installed in an outside location the collection, charging and distribution machine 102 may include an array of photovoltaic (PV) cells 118 to produce electrical power from solar insolation. Alternatively, the collection, charging and distribution machine 102 may be electrically coupled to a microturbine (e.g., wind turbine) or PV array positioned elsewhere at the location 112, for instance on a roof top or mounted at a top of a pole (not shown).

The collection, charging and distribution machine 102 may be communicatively coupled to one or more remotely located computer systems, such as back end or back office systems (only one shown) 120. The back end or back office systems 120 may collect data from and/or control a plurality of collection, charging and distribution machines 102 distributed about an area, such as a city. In some embodiments, the back end or back office systems 120 may collect data from and/or control a plurality of the portable electrical energy storage devices 106, such as by generating, tracking, sending and/or receiving one or more codes included in a wireless signal 119 sent by the collection, charging and distribution machine 102 to an all-electric scooter or motorbike 108 or other vehicle. The sending and/or receiving one or more codes enables access to the portable electrical energy storage device compartments of the portable electrical energy storage devices 106 for placing a portable electrical energy storage device 106z in a respective all-electric scooter or motorbike 108 while the all-electric scooter or motorbike 108 is in the vicinity of the collection, charging and distribution machine 102 or other authorized external device. The communications between the back end or back office systems 120 and the collection, charging and distribution machine 102 may occur over one or more communications channels including one or more networks 122, or non-networked communications channels. Also, in some embodiments, the back end or back office systems 120 may collect data from and/or control a plurality of the portable electrical energy storage devices 106, such as by tracking, sending and/or receiving information regarding unsafe conditions of the portable electrical energy storage devices 106 that is included in a wireless signal 119 sent from the collection, charging and distribution machine 102, from the portable electrical energy storage devices 106 and/or from the all-electric scooter or motorbike 108 or other vehicle. Communications may be over one or more wired communications channels (e.g., twisted pair wiring, optical fiber), wireless communications channels (e.g., radio, microwave, satellite, 801.11 compliant). Networked communications channels may include one or more local area networks (LANs), wide area networks (WANs), extranets, intranets, or the Internet including the World Wide Web portion of the Internet.

The collection, charging and distribution machine 102 may include a user interface 124. The user interface may include a variety of input/output (I/O) devices to allow an end user to interact with the collection, charging and distribution machine 102. Various I/O devices are called out and described in reference to FIG. 2, which follows.

Figure 2:
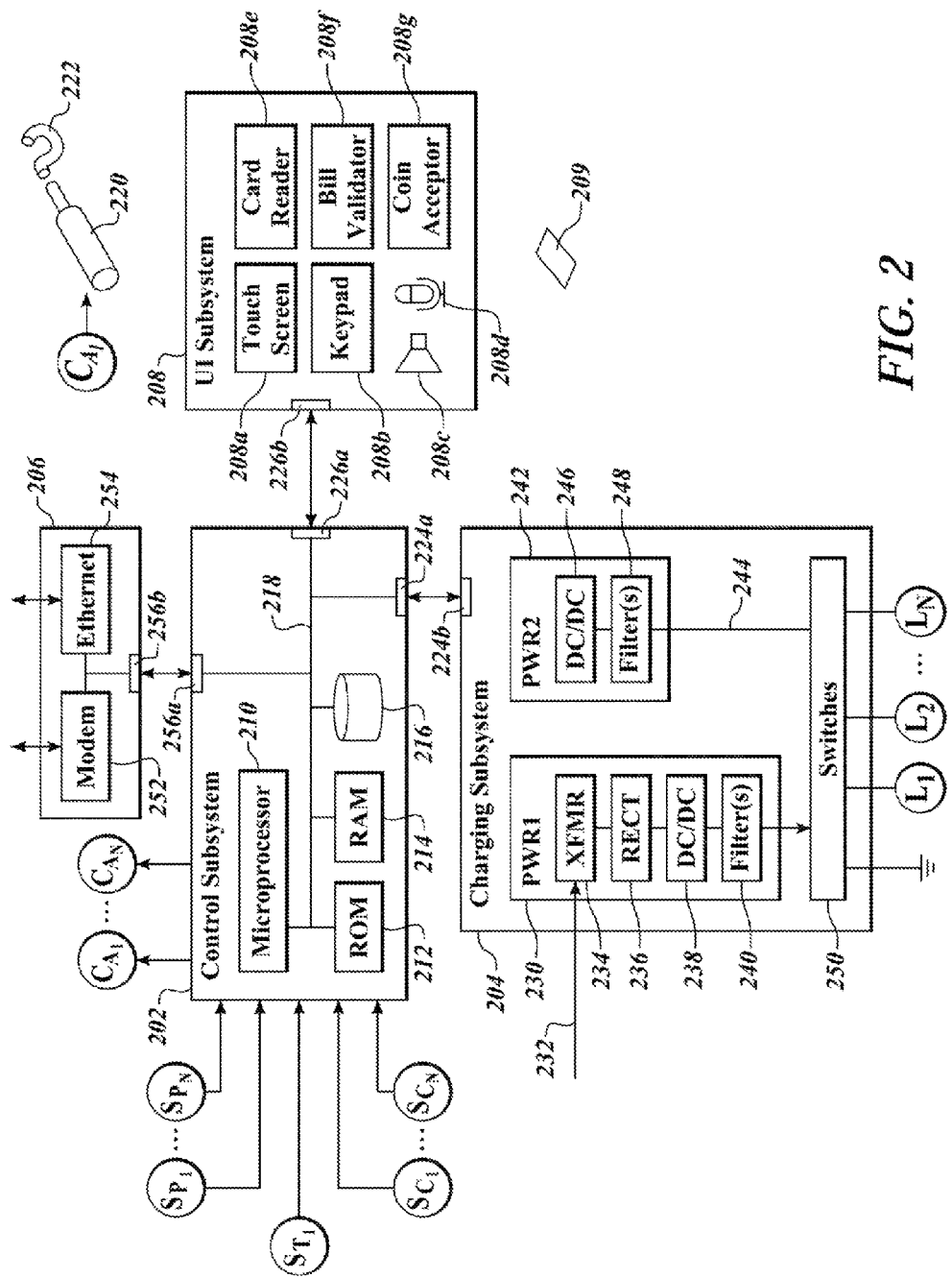
FIG. 2 is a block diagram of the collection, charging and distribution machine of FIG. 1, according to one non-limiting illustrated embodiment.

FIG. 2 shows the collection, charging and distribution machine 102 of FIG. 1, according to one illustrated embodiment.

The collection, charging and distribution machine 102 includes a control subsystem 202, a charging subsystem 204, a communications subsystem 206, and a user interface subsystem 208.

The control subsystem 202 includes a controller 210, for example a microprocessor, microcontroller, programmable logic controller (PLC), programmable gate array (PGA), application specific integrated circuit (ASIC) or another controller capable of receiving signals from various sensors, performing logical operations, and sending signals to various components. Typically, the controller 210 may take the form of a microprocessor (e.g., INTEL, AMD, ATOM). The control subsystem 202 may also include one or more non-transitory processor- or computer-readable storage media, for example read-only memory (ROM) 212, random access memory (RAM) 214, and data store 216 (e.g., solid-state storage media such as flash memory or EEPROM, or spinning storage media such as hard disk). The non-transitory processor- or computer-readable storage media 212, 214, 216 may be in addition to any non-transitory storage medium (e.g., registers) which is part of the controller 210. The control subsystem 202 may include one or more buses 218 (only one illustrated) coupling various components together, for example one or more power buses, instruction buses, data buses, etc.

As illustrated, the ROM 212, or some other one of the non-transitory processor- or computer-readable storage media 212, 214, 216, stores instructions and/or data or values for variables or parameters. The sets of data may take a variety of forms, for example a lookup table, a set of records in a database, etc. The instructions and sets of data or values are executable by the controller 210. Execution of the instructions and sets of data or values causes the controller 210 to perform specific acts to cause the collection, charging and distribution machine 102 to collect, charge, and distribute portable energy storage devices, and to receive information regarding unsafe conditions of the portable electrical energy storage devices 106 that are in a respective portable electrical energy storage device compartment of an all-electric scooter or motorbike 108 or are in the respective compartments or receptacles 104a, 104b-104n of the collection, charging and distribution machine 102. Specific operation of the collection, charging and distribution machine 102 is described herein and also below with reference to FIG. 3B to FIG. 10 in the context of locking respective compartments or receptacles 104a, 104b-104n of the collection, charging and distribution machine 102 when unsafe conditions of portable electrical energy storage devices 106 are detected.

The controller 210 may use RAM 214 in a conventional fashion, for volatile storage of instructions, data, etc. The controller 210 may use data store 216 to log or retain information, for example one or more codes that enable access to the portable electrical energy storage device compartment while the scooter or motorbike 108 is in the vicinity of the collection, charging and distribution machine 102, and/or information related to operation of the collection, charging and distribution machine 102 itself. The instructions are executable by the controller 210 to control operation of the collection, charging and distribution machine 102 in response to end user or operator input, and using data or values for the variables or parameters.

The control subsystem 202 receives signals from various sensors and/or other components of the collection, charging and distribution machine 102 which include information that characterizes or is indicative of operation, status, or condition of such other components, including the portable electrical energy storage devices 106. Sensors are represented in FIG. 2 by the letter S appearing in a circle along with appropriate subscript letters.

For example, one or more position sensors $S_{P1}$-$S_{PN}$ may detect the presence or absence of a portable electrical energy storage device 106 at each of the receivers or compartments 104. The position sensors $S_{P1}$-$S_{PN}$ may take a variety of forms. For example, the position sensors $S_{P1}$-$S_{PN}$ may take the form of mechanical switches that are closed, or alternatively opened, in response to contact with a portion of a respective portable electrical energy storage device 106 when the portable electrical energy storage device 106 is inserted into the receiver 104. Also for example, the position sensors $S_{P1}$-$S_{PN}$ may take the form of optical switches (i.e., optical source and receiver) that are closed, or alternatively opened, in response to contact with a portion of a respective portable electrical energy storage device 106 when the portable electrical energy storage device 106 is inserted into the receiver 104. Also for example, the position sensors $S_{P1}$-$S_{PN}$ may take the form of electrical sensors or switches that are closed, or alternatively opened, in response to detecting a closed circuit condition created by contact with the terminals 110 of a respective portable electrical energy storage device 106 when the portable electrical energy storage device 106 is inserted into the receiver 104, or an open circuit condition that results from the lack of a respective portable electrical energy storage device 106 in the receiver 104. These examples are intended to be non-limiting, and it is noted that any other structures and devices for detecting the presence/absence or even the insertion of the portable electrical energy storage devices 106 into receivers may be employed.

For example, one or more charge sensors $S_{C1}$-$S_{CN}$ may detect charge of the portable electrical energy storage devices 106 at each of the receivers 104. Charge sensors $S_{C1}$-$S_{CN}$ may detect the amount of charge stored by the portable electrical energy storage devices 106. Charge sensors $S_{C1}$-$S_{CN}$ may additionally detect an amount of charge and/or rate of charging being supplied to ones of the portable electrical energy storage devices 106 at each of the receivers 104. Such may allow assessment of current (i.e., temporal) charge condition or status of each portable electrical energy storage device 106, as well as allow feedback control over charging of same, including control over rate of charging. Charge sensors $S_{C1}$-$S_{CN}$ may include any variety of current and/or voltage sensors. For example, one or more charge sensors $S_{T1}$ (only one shown) may detect or sense a temperature at the receivers 104 or in the ambient environment. Such sensors may work individually or in combination to detect one or more unsafe conditions of a respective portable electrical energy storage device 106 (e.g., portable electrical energy storage device 106n) in the respective receiver or compartment (e.g., 104n). For example, this may be based on, but is not limited to, for example, one or more of: a temperature level of a circuit to which the portable electrical energy storage device 106n is connected, a voltage level of a circuit to which the portable electrical energy storage device 106n is connected, a current level of a circuit to which the portable electrical energy storage device 106n is connected, a temperature of the portable electrical energy storage device 106n, a temperature of an inside of a compartment or receiver 104n in which the portable electrical energy storage device 106n is located, and a short circuit of a circuit to which the portable electrical energy storage device 106n is connected, etc.

The control subsystem 202 provides signals to various actuators and/or other components responsive to control signals, which signals include information that characterizes or is indicative of an operation the component is to perform or a state or condition into which the components should enter. Control signals, actuators or other components responsive to control signals are represented in FIG. 2 by the letter C appearing in a circle along with appropriate subscript letters.

For example, one or more engine control signals $C_{A1}$-$C_{AN}$ may affect the operation of one or more actuators 220 (only one illustrated). For instance, a control signal $C_{A1}$ may cause movement of an actuator 220 between a first and a second position or change a magnetic field produced by the actuator 220. The actuator 220 may take any of a variety of forms, including but not limited to a solenoid, an electric motor such as a stepper motor, or an electromagnet. The actuator 220 may be coupled to operate a latch, lock or other retainer mechanism 222. The latch, lock or other retainer mechanism 222 may selectively secure, cover and/or retain one or more portable electrical energy storage devices 106 (FIG. 1) in the compartment or receiver 104 (FIG. 1). For instance, the latch, lock or other retainer mechanism 222 may physically couple to a complimentary structure that is part of a housing of the portable electrical energy storage devices 106 (FIG. 1). Alternatively, the latch, lock or other retainer mechanism 222 may magnetically couple to a complimentary structure that is part of a housing of the portable electrical energy storage devices 106 (FIG. 1). Also for instance, the latch, lock or other retainer mechanism 222 may open a receiver 104 (FIG. 1), or may allow a receiver 104 to be opened, to receive a partially or fully discharged portable electrical energy storage device 106 for charging. For example, the actuator may open and/or close a door to the receiver 104 (FIG. 1), to selectively provide or prevent access to a portable electrical energy storage device 106 (FIG. 1) received therein. Also for example, the actuator may open and/or close a latch or lock, allowing an end user to open and/or close a door to the receiver 104 (FIG. 1), to selectively provide access to a portable electrical energy storage device 106 (FIG. 1) received therein. Also, for example, one or more of the control signals $C_{A1}$-$C_{AN}$ may cause operation of one or more actuators 220 to prevent access to the portable electrical energy storage device 106n, or close the compartment or receiver 104n when an unsafe condition of the portable electrical energy storage device 106n is detected by the control subsystem 202 based on information received by the control subsystem 202 from one or more of the sensors $S_{C1}$-$S_{CN}$. For example, such an unsafe condition may be defined by information from the sensors $S_{C1}$-$S_{CN}$, such as electric current level, voltage level, temperature, etc., reaching applicable thresholds levels.

The control subsystem 202 may include one or more ports 224a to provide control signals to one or more ports 224b of the charging subsystem 204. The ports 224a, 224b may provide bi-directional communications. The control subsystem 202 may include one or more ports 226a to provide control signals to one or more ports 226b of the user interface subsystem 208. The ports 226a, 226b may provide bi-directional communications.

The charging subsystem 204 includes various electrical and electronic components to charge portable electrical energy storage devices 106 when positioned or received in the receivers 104. For example, the charging subsystem 204 may include one or more power buses or power bus bars, relays, contactors or other switches (e.g., insulated gate bipolar transistors or IGBTs, metal oxide semiconductor transistors or MOSFETs), rectifier bridge(s), current sensors, ground fault circuitry, etc. The electrical power is supplied via contacts that can take any of a variety of forms, for instance terminals, leads, posts, etc. The contacts allow electrical coupling of various components. Some possible implementations are illustrated in FIG. 2. Such is not intended to be exhaustive. Additional components may be employed while other components may be omitted.

The illustrated charging subsystem 204 includes a first power converter 230 that receives electrical power from the electrical service 114 (FIG. 1) via a line or cord 232. The power will typically be in the form of single two- or three-phase AC electrical power. As such, the first power converter 230 may need to convert and otherwise condition the electrical power received via the electrical services 114 (FIG. 1), for example for rectifying an AC waveform to DC, transforming voltage, current, and phase, as well as reducing transients and noise. Thus, the first power converter 230 may include a transformer 234, rectifier 236, DC/DC power converter 238, and filter(s) 240.

The transformer 234 may take the form of any variety of commercially available transformers with suitable ratings for handling the power received via the electrical service 114 (FIG. 1). Some embodiments may employ multiple transformers. The transformer 234 may advantageously provide galvanic isolation between the components of the collection, charging and distribution machine 102 and the grid 116 (FIG. 1). The rectifier 236 may take any of variety of forms, for example a full bridge diode rectifier or a switch mode rectifier. The rectifier 236 may be operated to transform AC electrical power to DC electrical power. The DC/DC power converter 238 may take any of a large variety of forms. For example, DC/DC power converter 238 may take the form a switch mode DC/DC power converter, for instance employing IGBTs or MOSFETs in a half or full bridge configuration, and may include one or more inductors. The DC/DC power converter 238 may have any number of topologies including a boost converter, buck converter, synchronous buck converter, buck-boost converter or fly-back converter. The filter(s) 240 may include one or more capacitors, resistors, Zener diodes or other elements to suppress voltage spikes, or to remove or reduce transients and/or noise.

The illustrated charging subsystem 204 may also receive electrical power from a renewable power source, for example the PV array 118 (FIG. 1). Such may be converted or conditioned by the first power converter 230, for example being supplied directly to the DC/DC power converter 238, bypassing the transformer 236 and/or rectifier 236. Alternatively, the illustrated charging subsystem 204 may include a dedicated power converter to convert or otherwise condition such electrical power.

The illustrated charging subsystem 204 may optionally include second power converter 242 that receives electrical power from one or more portable electrical energy storage devices 106 (FIG. 1) via one or more lines 244, for charging other ones of the portable electrical energy storage devices 106. As such, the second power converter 242 may need to convert and/or otherwise condition the electrical power received from portable electrical energy storage devices 106, for example optionally transforming voltage or current, as well as reducing transients and noise. Thus, the second power converter 242 may optionally include a DC/DC power converter 246 and/or filter(s) 248. Various types of DC/DC power converters and filters are discussed above.

The illustrated charging subsystem 204 includes a plurality of switches 250 responsive to the control signals delivered via ports 224a, 224b from the control subsystem 202. The switches may be operable to selectively couple a first number or set of portable electrical energy storage devices 106 to be charged from electrical power supplied by both the electrical service via the first power converter 230 and from electrical power supplied by a second number or set of portable electrical energy storage devices 106. The first number or set of portable electrical energy storage devices 106 may include a single portable electrical energy storage device 106, two, or even more portable electrical energy storage devices 106. The second number or set of portable electrical energy storage devices 106 may include a single portable electrical energy storage device 106, two, or even more portable electrical energy storage devices 106. The portable electrical energy storage devices 106 are represented in FIG. 2 as loads $L_1$, $L_2$-$L_N$.

The communications subsystem 206 may additionally include one or more communications modules or components which facilitate communications with the various components of a back end or back office system 120 (FIG. 1), various components of the all-electric scooter or motorbike 108, various components of the portable electrical energy storage devices 106, and/or various components of a portable electrical energy storage device compartment of the all-electric scooter or motorbike 108. The communications subsystem 206 may, for example, include one or more modems 252 and/or one or more Ethernet cards or other types of communications cards or components 254. A port 256a of the control subsystem 202 may communicatively couple the control subsystem 202 with a port 256b of the communications subsystem 206. The communications subsystem 206 may provide wired and/or wireless communications. For example, the communications subsystem 206 may provide components enabling short range (e.g., via Bluetooth, near field communication (NFC), radio frequency identification (RFID) components and protocols) or longer range wireless communications (e.g., over a wireless LAN, satellite, or cellular network) with various other devices external to the collection, charging and distribution machine 102, including various components of the all-electric scooter or motorbike 108, various components of the portable electrical energy storage devices 106, and/or various components of a portable electrical energy storage device compartment of the all-electric scooter or motorbike 108. The communications subsystem 206 may include one or more ports, wireless receivers, wireless transmitters or wireless transceivers to provide wireless signal paths to the various remote components or systems. The communications subsystem 206 may include one or more bridges or routers suitable to handle network traffic including switched packet type communications protocols (TCP/IP), Ethernet or other networking protocols.

The user interface subsystem 208 includes one or more user input/output (I/O) components. For example, user interface subsystem 208 may include a touch screen display 208a operable to present information to an end user, and a graphical user interface (GUI) to receive indications of user selections. The user interface subsystem 208 may include a keyboard or keypad 208b, and/or a cursor controller (e.g., mouse, trackball, trackpad) (not illustrated) to allow an end user to enter information and/or select user selectable icons in a GUI. The user interface subsystem 208 may include a speaker 208c to provide aural messages to an end user and/or a microphone 208d to receive spoken user input such as spoken commands.

The user interface subsystem 208 may include a card reader 208e to read information from card type media 209. The card reader 208e may take a variety of forms. For instance, the card reader 208e may take the form of, or include, a magnetic stripe reader for reading information encoded in a magnetic stripe carried by a card 209. For instance, the card reader 208e may take the form of, or include, a machine-readable symbol (e.g., barcode, matrix code) card reader for reading information encoded in a machine-readable symbol carried by a card 209. For instance, the card reader 208e may take the form of, or include, a smart card reader for reading information encoded in a non-transitory medium carried by a card 209. Such may, for instance, include media employing radio frequency identification (RFID) transponders or electronic payment chips (e.g., near field communications (NFC) chips, such as used by electronic wallet (e-wallet) applications, etc.). Thus, the card reader 208e may be able to read information from a variety of card media 209, for instance credit cards, debit cards, gift cards, and prepaid cards, as well as identification media such as driver licenses. The card reader 208e may also be able to read information encoded in a non-transitory medium carried by the portable electrical energy storage devices 106, and may also include RFID transponders, transceivers, NFC chips and/or other communications devices to communicate information to various components of the all-electric scooter or motorbike 108, various components of the portable electrical energy storage devices 106, and/or various components of a portable electrical energy storage device compartment of the all-electric scooter or motorbike 108 (e.g., information regarding a current or previous unsafe condition of the portable electrical energy storage device 106, information for authentication of the collection, charging and distribution machine 102 to the portable electrical energy storage device compartment of the all-electric scooter or motorbike 108, or for authentication of the of the all-electric scooter or motorbike 108 to the collection, charging and distribution machine 102).

The user interface subsystem 208 may include a bill acceptor 208f and a validator and/or coin acceptor 208g to accept and validate cash payments. Such may be highly useful in servicing populations lacking access to credit. Bill acceptor and validator 208f and/or coin acceptor 208g may take any variety of forms, for example those that are currently commercially available and used in various vending machines and kiosks.

Figure 3A:
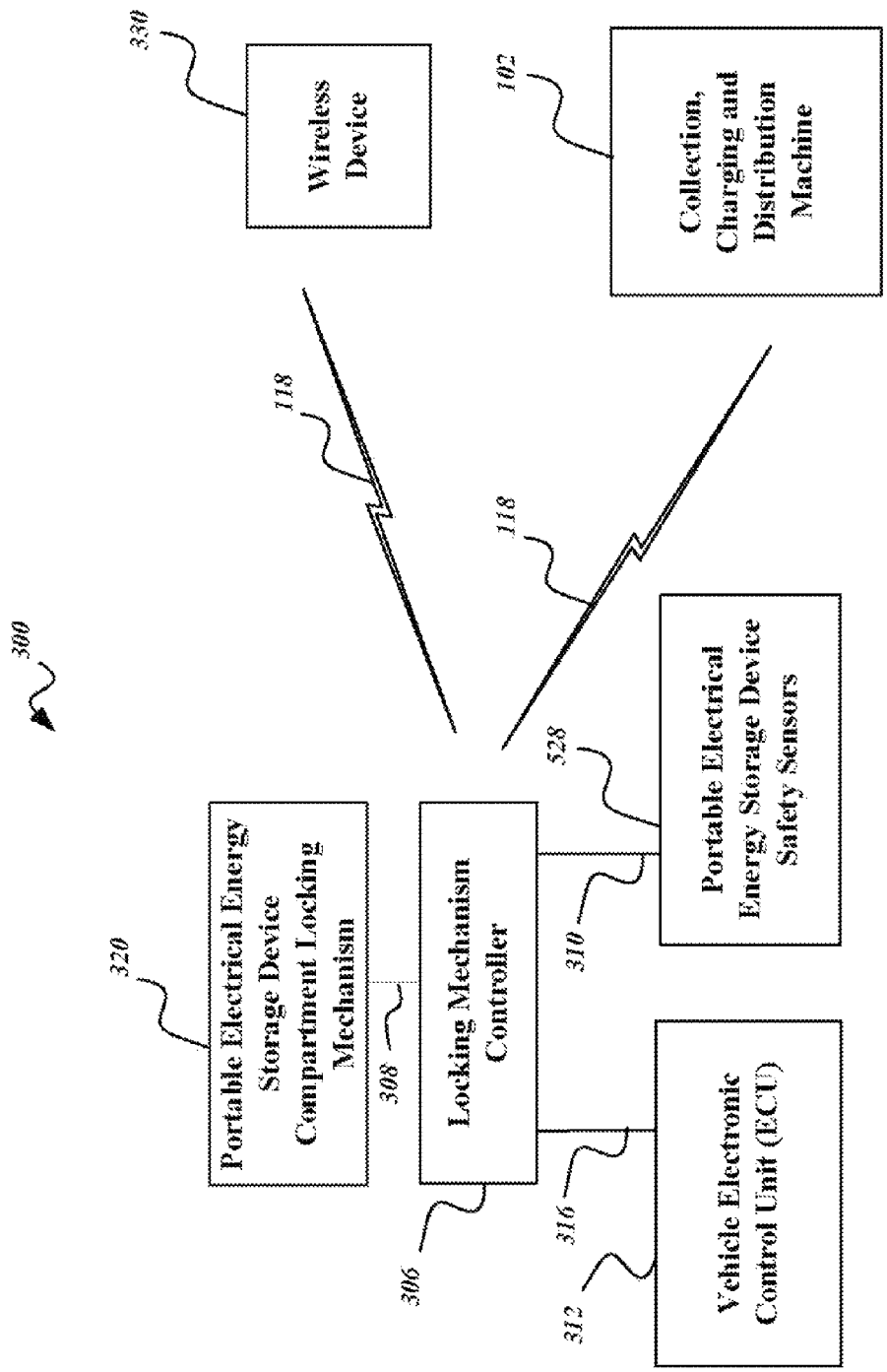
FIG. 3A is a block diagram of a portable electrical energy storage device compartment locking system for the portable electrical energy storage device of the scooter or motorbike of FIG. 1, according to one non-limiting illustrated embodiment.

FIG. 3A is a block diagram of a portable electrical energy storage device compartment locking system 300 for the portable electrical energy storage device of the scooter or motorbike 108 of FIG. 1, according to one non-limiting illustrated embodiment. In particular, FIG. 3A shows a portable electrical energy storage device compartment locking system 300 for the portable electrical energy storage device 106z of the scooter or motorbike 108 of FIG. 1 in wireless communication in one instance with the collection, charging and distribution machine 102 of FIG. 1 and in another instance with an external wireless device 330, according to one non-limiting illustrated embodiment.

Shown is a portable electrical energy storage device compartment locking mechanism 320 operably coupled to a locking mechanism controller 306 via communication line 308. The locking mechanism controller 306 is also operably coupled to one or more portable electrical energy storage device safety sensors 528 via communication line 310 and to a vehicle electronic control unit 312 of the vehicle 108 via communication line 316. In some alternative embodiments, the vehicle electronic control unit 312 may instead or also be coupled to the portable electrical energy storage device safety sensors 528 and/or the locking mechanism controller 306 may be part of the vehicle electronic control unit 312. In some embodiments, the vehicle electronic control unit 312 may perform the functions of the locking mechanism controller 306 described herein.

In some embodiments, the portable electrical energy storage device compartment locking mechanism 320 and the locking mechanism controller 306 are part of a portable electrical energy storage device compartment (shown in FIGS. 5-7) of the scooter or motorbike 108. One or more of the portable electrical energy storage device safety sensors 528, locking mechanism controller 306, and portable electrical energy storage device compartment locking mechanism 320 may instead be operably located inside or attached to the portable electrical energy storage device 106z.

As the portable electrical energy storage devices 106z shown in FIG. 1 may be lent, leased, rented out, or otherwise provided to the public, it is desirable to control how and in what circumstances the portable electrical energy storage device compartment for the portable electrical energy storage device 106z may be accessed. For example, the portable electrical energy storage device 106z may encounter unsafe conditions while being used or stored in the vehicle 108. Thus, the locking mechanism controller 306 may cause a compartment in which the portable electrical energy storage device 106z is currently being held to lock when such conditions occur or are determined to be imminent. Such unsafe conditions may be caused by overheating, melting or explosion caused by a short circuit, system malfunction, environmental conditions or other catastrophic failure of the portable electrical energy storage device 106z. Locking the compartment in which the portable electrical energy storage device 106z is currently being held when such conditions occur may be a safety measure that helps contain the unsafe condition inside the compartment or may help prevent injury to a user attempting to access the portable electrical energy storage device 106z when such conditions are present or are determined to be imminent.

In some embodiments, in response to receiving information regarding an unsafe condition from the portable electrical energy storage device safety sensors 528 over communication line 310, the locking mechanism controller 306 determines whether the portable electrical energy storage device is in a desired state to have the compartment locked. If the locking mechanism controller 306 determines the portable electrical energy storage device is in the desired state to have the compartment locked, then it sends a signal over communication line 308 to the portable electrical energy storage device compartment locking mechanism 320, causing the portable electrical energy storage device compartment locking mechanism 320 to lock the compartment in which the portable electrical energy storage device 106z is located to prevent a user from opening the compartment and thus help protect the user against the unsafe condition. For example, the unsafe condition may be a potential or existing catastrophic failure of the portable electrical energy storage device 106z in the compartment (e.g., a meltdown, explosion or dangerous leak, etc.).

A temperature level, a voltage level and/or a current level of the portable electrical energy storage device 106z and/or a circuit to which the portable electrical energy storage device 106z is connected being above a particular respective threshold may be indicative of such an unsafe condition. Also, a temperature, contaminant level, or pressure level inside the compartment in which the portable electrical energy storage device 106z is located, or inside the portable electrical energy storage device 106z itself, being above a particular respective threshold may be indicative of such an unsafe condition. Thus, the desired state to have the compartment locked may be a state in which one or more of a temperature level, a voltage level and a current level of a circuit to which the portable electrical energy storage device 106z is connected is above a particular respective threshold. Also, alone or in combination with such factors, the desired state to have the compartment locked may be a state in which one or more of a temperature, contaminant level, or pressure level inside the compartment in which the portable electrical energy storage device 106z is located, or inside the portable electrical energy storage device 106z itself, is above a particular respective threshold.

In some embodiments, such thresholds may be according to, or otherwise dependent on, the type of portable electrical energy storage device 106z or other specifications of the portable electrical energy storage device 106z. For example, a particular portable electrical energy storage device may be able to operate at higher temperatures, current and/or voltage levels than other portable electrical energy storage devices. The locking mechanism controller 306 may select which threshold to use in its determination of whether to lock the compartment in which the portable electrical energy storage device 106z is located based on such portable electrical energy storage device specifications.

The portable electrical energy storage device safety sensors 528 may include one or more sensors coupled to the locking mechanism controller 306 via communication line 310 that sense such conditions indicative of the unsafe condition. For example, the conditions indicative of the unsafe condition may include conditions regarding one or more of: a temperature level of a circuit to which the portable electrical energy storage device is connected; a voltage level of a circuit to which the portable electrical energy storage device 106z is connected; a current level of a circuit to which the portable electrical energy storage device 106z is connected; a temperature of the portable electrical energy storage device 106z; a temperature inside the compartment in which the portable electrical energy storage device 106z is located; a contaminant level inside the compartment in which the portable electrical energy storage device 106z is located; a pressure level inside the compartment in which the portable electrical energy storage device 106z is located; a contaminant level inside the portable electrical energy storage device 106z; a pressure level inside the portable electrical energy storage device 106z; and a short circuit of a circuit to which the portable electrical energy storage device is connected. Thus, as applicable, in some embodiments, the portable electrical energy storage device safety sensors 528 may include one or more of: a volt sensor, a voltmeter, a current sensor, an ammeter, a watt sensor, a wattmeter, an electrical resistance sensor, an ohmmeter, a fuse, a temperature sensor, a resistance temperature detector (RTD), a thermistor, thermocouple, a diode, thermostat, a thermometer, a pressure sensor, an air pressure sensor, a contaminant sensor, etc., operably coupled to the portable electrical energy storage device 106z or to a circuit to which the portable electrical energy storage device 106z is connected. Such portable electrical energy storage device safety sensors 528 may be mechanical, analog, digital, integrated circuit sensors, or any applicable combination thereof.

In some embodiments, the locking mechanism controller 306, in response to receiving the information regarding the unsafe condition of the portable electrical energy storage device 106z, sends a signal via communication line 316 to the vehicle's electronic control unit 312 to reduce or eliminate a current power draw by the vehicle 108 from the portable electrical energy storage device 106z. Such reduction or elimination of the current power draw by the vehicle 108 from the portable electrical energy storage device 106z may resolve, reduce or postpone such an unsafe condition and/or prevent it from worsening. This may be in addition to or instead of determining to lock the compartment in which the portable electrical energy storage device 106z is located. The locking mechanism controller 306 may select which threshold(s) to use in its determination of whether to send a signal to the vehicle's electronic control unit 312 to reduce or eliminate a current power draw by the vehicle 108 from the portable electrical energy storage device 106z and/or to lock the compartment in which the portable electrical energy storage device 106z is located based at least in part on such portable electrical energy storage device specifications as described above.

Also shown is the collection, charging and distribution machine 102 in wireless communication with the locking mechanism controller 306. For example, the communications subsystem 206 (shown in FIG. 2) of the collection, charging and distribution machine 102 may provide components enabling short range (e.g., via Bluetooth, near field communication (NFC), radio frequency identification (RFID) components and protocols) or longer range wireless communications (e.g., over a wireless LAN, satellite, or cellular network) with various other devices external to the collection, charging and distribution machine 102, including the locking mechanism controller 306. The communications subsystem 206 of the collection, charging and distribution machine 102 may include one or more ports, wireless receivers, wireless transmitters or wireless transceivers to provide wireless signal paths to the locking mechanism controller 306. The communications subsystem 206 of the collection, charging and distribution machine 102 may also or instead include connections to one or more bridges or routers suitable to handle network traffic including switched packet type communications protocols (TCP/IP), Ethernet or other networking protocols.

The control of the access to the portable electrical energy storage device compartment of the portable electrical energy storage device 106z may also be used to allow access to the portable electrical energy storage device by authorized personnel such as a technician or manufacturer based on authenticated information after such unsafe condition has been detected. Such control based on authenticated information also helps to prevent theft and/or misuse of the portable electrical energy storage device 106z and provides for convenient access to the portable electrical energy storage device 106z when replacing or putting a new portable electrical energy storage device 106z in the scooter or motorbike 108 (such as when replacing the portable electrical energy storage device 106z with a new portable electrical energy storage device 106z at the collection, charging and distribution machine 102).

For example, the portable electrical energy storage device compartment may be locked or otherwise secured until the locking mechanism controller 306 detects a wireless signal 119 including authentication information from an external wireless device 330 or the collection, charging and distribution machine 102 via one or more wireless communications subsystems such as that described above with respect to the collection, charging and distribution machine 102. Such external wireless devices including one or more wireless communications subsystems such as that described above with respect to the collection, charging and distribution machine 102 may include, but are not limited to: card keys, access cards, credit cards, access control key fobs, mobile computing devices, cellular telephones, personal digital assistants (PDAs), smart phones, battery chargers, other access control devices, etc. Also, information regarding detected unsafe conditions of the portable electrical energy storage device 106z may be communicated to such an external wireless device 330 to notify a user of such a condition or to communicate such conditions to the backend system 120 such that the information can be analyzed and acted upon by the backend system and/or collection, charging and distribution machine 102 accordingly.

Figure 3B:
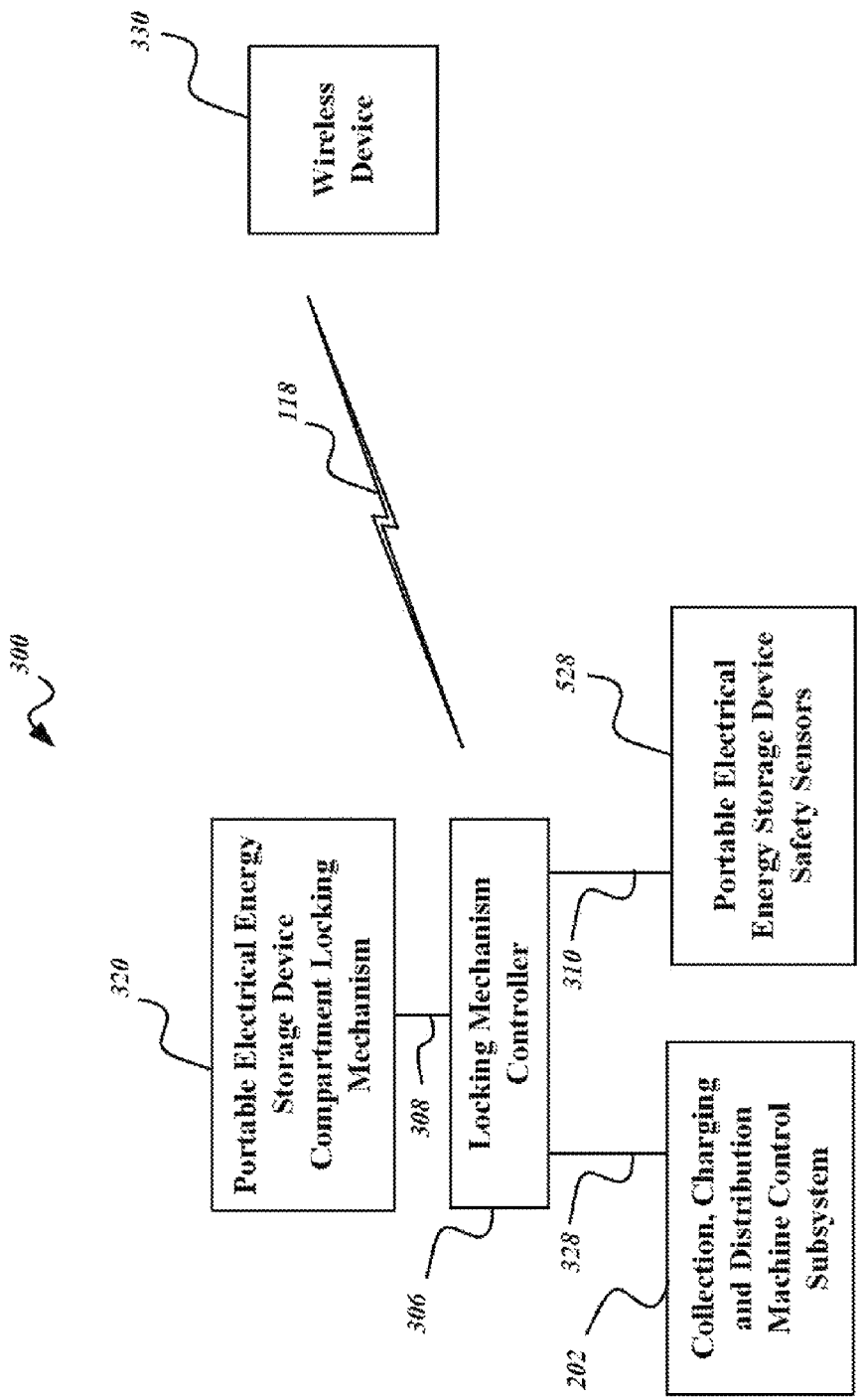
FIG. 3B is a block diagram of a portable electrical energy storage device compartment locking system for the collection, charging and distribution machine of FIG. 1, according to one non-limiting illustrated embodiment.

FIG. 3B is a block diagram of a portable electrical energy storage device compartment locking system for the collection, charging and distribution machine 102 of FIG. 1, according to one non-limiting illustrated embodiment. As the portable electrical energy storage device 106z may encounter unsafe conditions while being charged or stored in the collection, charging and distribution machine 102, it may be desirable to lock a compartment in which the portable electrical energy storage device 106 is currently being held when such conditions occur, cut off or reduce current to or from the portable electrical energy storage device 106z, lock other compartments in which other portable electrical energy storage devices 106 are being held in the collection, charging and distribution machine 102, display or send an alert regarding the unsafe condition, and/or or otherwise prevent a user from accessing one or more portable electrical energy storage devices 106 in the collection, charging and distribution machine 102. Such unsafe conditions may be caused by overheating, melting or explosion caused by a short circuit, system malfunction, environmental conditions or other catastrophic failure. Such actions may be safety measures that help contain the unsafe condition inside the compartment or collection, charging and distribution machine 102 or may prevent injury to a user attempting to access the portable electrical energy storage device 106z when such conditions are present or are imminent.

Shown is a portable electrical energy storage device compartment locking mechanism 320 operably coupled to the locking mechanism controller 306 via communication line 308. The locking mechanism controller 306 is also operably coupled to one or more portable electrical energy storage device safety sensors 528 via communication line 310 and to a charging and distribution machine control subsystem 202 via communication line 328. In some alternative embodiments, the charging and distribution machine control subsystem 202 may instead or also be coupled to the portable electrical energy storage device safety sensors 528 and/or the locking mechanism controller 306 may be part of the charging and distribution machine control subsystem 202, or the charging and distribution machine control subsystem 202 may perform the functions of the locking mechanism controller 306 described herein. In some embodiments, the portable electrical energy storage device compartment locking mechanism 320 and the locking mechanism controller 306 are part of a portable electrical energy storage device 106z, the respective receivers, compartments or receptacles 104a, 104b-104n of the collection, charging and distribution machine 102. One or more of the portable electrical energy storage device safety sensors 528, locking mechanism controller 306, and portable electrical energy storage device compartment locking mechanism 320 may instead be operably located inside or attached to the portable electrical energy storage device 106z. Among other sensors, the portable electrical energy storage device safety sensors 528 may include the one or more charge sensors $S_{C1}$-$S_{CN}$ that may detect charge of the portable electrical energy storage devices 106 at each of the receivers, compartments or receptacles 104a, 104b-104n of the collection, charging and distribution machine 102.

In some embodiments, in response to receiving information regarding an unsafe condition from the portable electrical energy storage device safety sensors 528 over communication line 310, the locking mechanism controller 306 determines whether the compartment (e.g., compartment 104n) in the collection, charging and distribution machine 102 is in a desired state to have the compartment locked. The locking mechanism controller 306 may also or instead determine whether to cut off or reduce current to or from the portable electrical energy storage device 106n (e.g., shown in FIG. 1), lock other compartments in which other portable electrical energy storage devices 106 are being held in the collection, charging and distribution machine 102, display or send an alert regarding the unsafe condition, and/or or otherwise prevent a user from accessing one or more portable electrical energy storage devices 106 in the collection, charging and distribution machine 102. If the locking mechanism controller 306 determines the portable electrical energy storage device is in the desired state to have the compartment locked, to cut off or reduce current to or from the portable electrical energy storage device 106n, lock other compartments in which other portable electrical energy storage devices 106 are being held in the collection, charging and distribution machine 102, and/or display or send an alert regarding the unsafe condition, then the locking mechanism controller 306 sends an appropriate signal to do so over communication line 308 to either the portable electrical energy storage device compartment locking mechanism 320, causing the portable electrical energy storage device compartment locking mechanism 320 to lock the compartment 104n in which the portable electrical energy storage device 106n is located, and/or send an applicable signal(s) to the charging and distribution machine control subsystem 202 via communication line 328 to causing the charging and distribution machine control subsystem 202 to perform the other applicable actions.

The control of the access to the portable electrical energy storage device compartment of the portable electrical energy storage device 106z may also be used to allow access to the portable electrical energy storage device 106n by authorized personnel such as a technician or manufacturer based on authenticated information after such an unsafe condition has been detected. For example, the portable electrical energy storage device compartment 104n may be locked or otherwise secured until the locking mechanism controller 306 detects a wireless signal 119 including authentication information from an external wireless device 330. Such external wireless devices including one or more wireless communications subsystems such as that described above with respect to the collection, charging and distribution machine 102 may include, but are not limited to: card keys, access cards, credit cards, access control key fobs, mobile computing devices, cellular telephones, personal digital assistants (PDAs), smart phones, battery chargers, other access control devices, etc. Also, information regarding detected unsafe conditions of the portable electrical energy storage device 106n may be communicated to such an external wireless device 330 or to the backend system 120 (shown in FIG. 1) directly to notify a user of such a condition or to communicate such conditions to the backend system 120 such that the information can be analyzed and acted upon by the backend system and/or collection, charging and distribution machine 102 accordingly.

Figure 4:
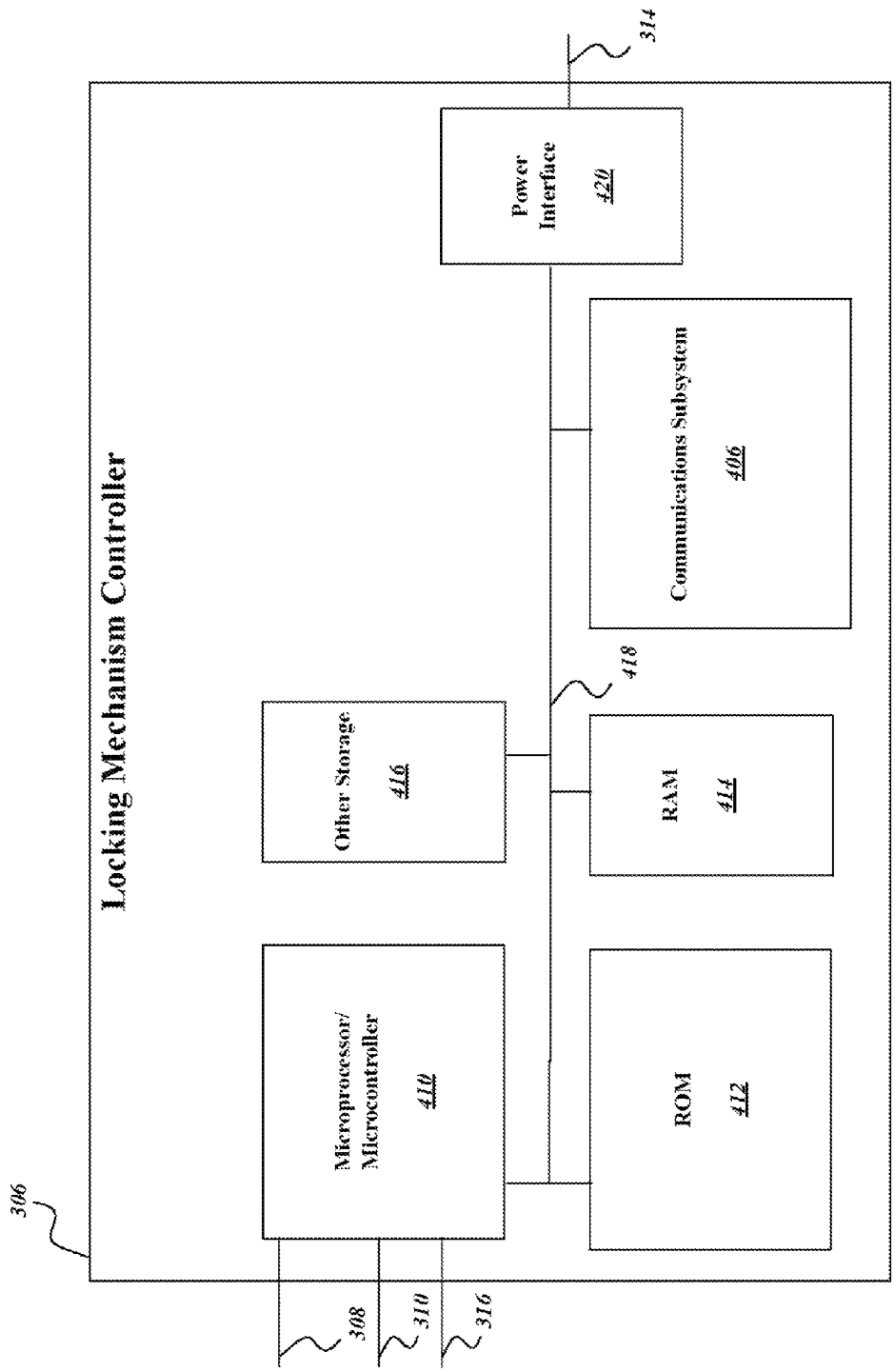
FIG. 4 is a schematic view of the locking mechanism controller of FIG. 3A, according to one non-limiting illustrated embodiment.

FIG. 4 is a schematic view of the locking mechanism controller 306 of FIG. 3A that is connected to the vehicle electronic control unit 312, according to one non-limiting illustrated embodiment. However, the schematic view of the locking mechanism controller 306 of FIG. 3A may also correspondingly apply to that of the locking mechanism controller 306 of FIG. 3B that is connected to the charging and distribution machine control subsystem 202 of FIG. 3B.

In some embodiments, the locking mechanism controller 306 includes a controller 410, a communications subsystem 406, and a power interface 420.

The controller 410, for example, is a microprocessor, microcontroller, programmable logic controller (PLC), programmable gate array (PGA), application specific integrated circuit (ASIC) or another controller capable of receiving signals from various sensors, performing logical operations, and sending signals to various components. Typically, the controller 410 may take the form of a microprocessor (e.g., INTEL, AMD, ATOM). The controller 410 is coupled to the portable electrical energy storage device compartment locking mechanism 320 via a control line 308, coupled to the vehicle electronic control unit 312 via a control line 316 and coupled to the portable electrical energy storage device safety sensors 528 via control line 310. However, in embodiments where the locking mechanism controller 306 is part of the collection, charging and distribution machine 102, such as that shown in FIG. 3B, the controller 410 is part of the charging and distribution machine control subsystem 202, or is otherwise coupled to the charging and distribution machine control subsystem 202 via communication line 328 as shown in FIG. 3B instead of to the vehicle electronic control unit 312.

The locking mechanism controller 306 may also include one or more non-transitory processor- or computer-readable storage media, for example read-only memory (ROM) 412, random access memory (RAM) 414, and other storage 416 (e.g., solid-state storage media such as flash memory or EEPROM, or spinning storage media such as hard disk). The non-transitory processor- or computer-readable storage media 412, 414, 416 may be in addition to any non-transitory storage medium (e.g., registers) which is part of the controller 410. The locking mechanism controller 306 may include one or more buses 418 (only one illustrated) coupling various components together, for example one or more power buses, instruction buses, data buses, etc.

Figure 8:
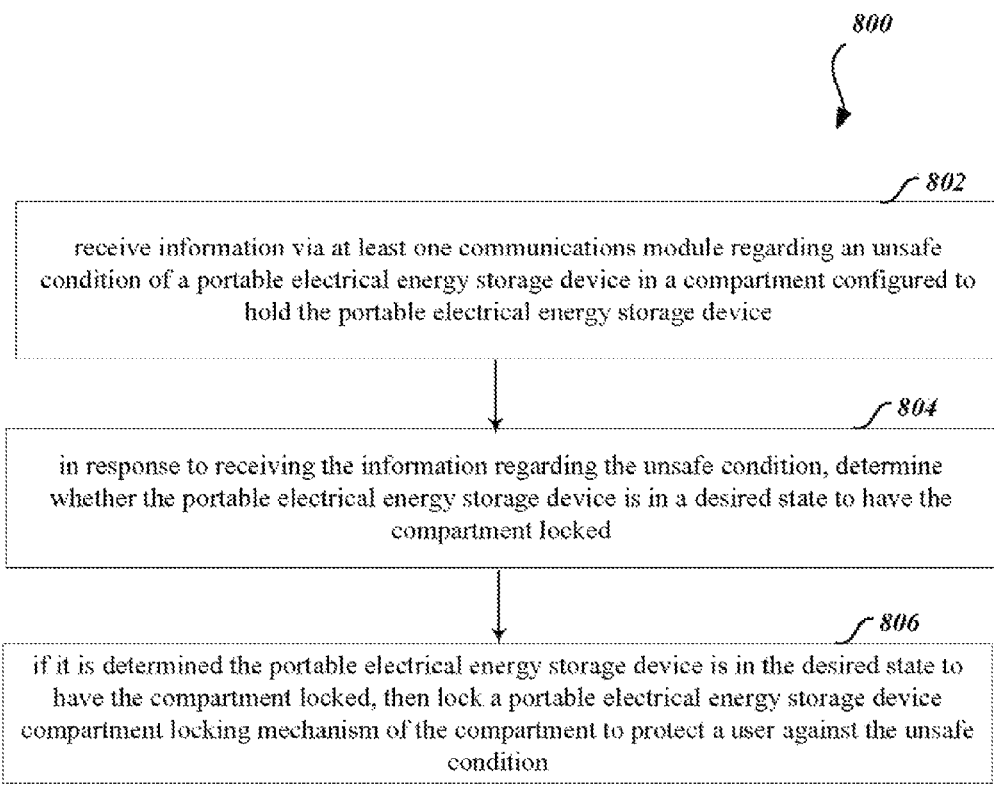
FIG. 8 is a flow diagram showing a method of operating the locking mechanism controller of FIGS. 3-7, according to one non-limiting illustrated embodiment.
Figure 9:
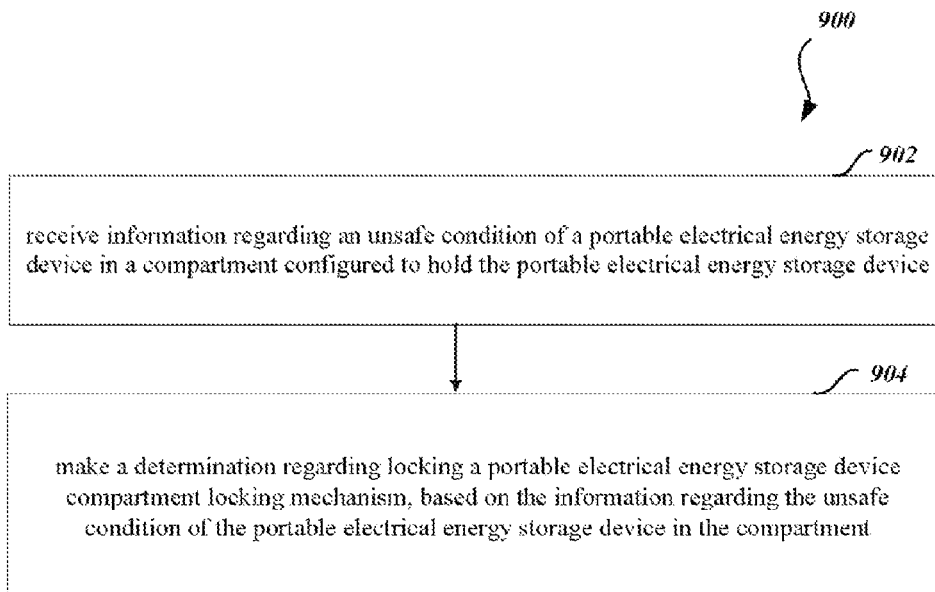
FIG. 9 is a flow diagram showing a method of the locking mechanism controller of FIGS. 3-7 locking a portable electrical energy storage device compartment locking mechanism, according to one non-limiting illustrated embodiment.
Figure 10:
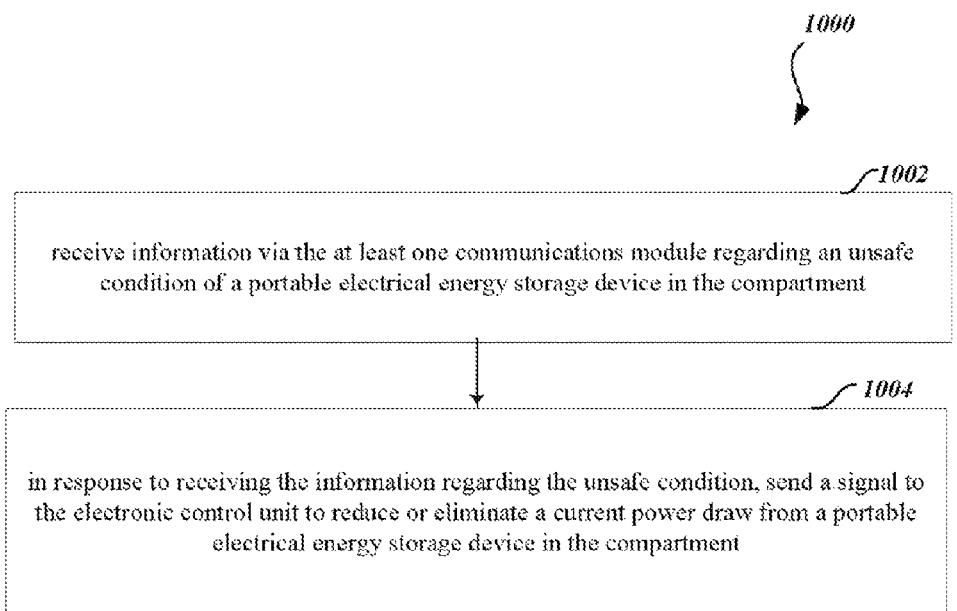
FIG. 10 is a flow diagram showing a method of the locking mechanism controller of FIGS. 3-7 sending a signal to the electronic control unit to reduce or eliminate a current power draw from the portable electrical energy storage device, according to one non-limiting illustrated embodiment.

As illustrated, the ROM 412, or some other one of the non-transitory processor- or computer-readable storage media 412, 414, 416, stores instructions and/or data or values for variables or parameters. The sets of data may take a variety of forms, for example a lookup table, a set of records in a database, etc. The instructions and sets of data or values are executable by the controller 410. Execution of the instructions and sets of data or values causes the controller 410 to perform specific acts to receive information from and send information to an external device and, based on such information, cause the locking mechanism controller 306 to generate control signals to lock or unlock the portable electrical energy storage device compartment locking mechanism 320, determine whether to cut off or reduce current to or from the portable electrical energy storage device 106z, lock other compartments in which other portable electrical energy storage devices may be located, display or send an alert regarding the unsafe condition, and/or or otherwise prevent a user from accessing one or more portable electrical energy storage devices. Specific operation of the locking mechanism controller 306 is described herein and also below with reference to FIGS. 1-10, including various flow diagrams (FIGS. 8-10).

The controller 410 may use RAM 414 in a conventional fashion, for volatile storage of instructions, data, etc. The controller 410 may use data store 416 to log or retain information, for example, including, but not limited to, one or more of: information from sensors 528; portable electrical energy storage device type and/or specifications; current, voltage, temperature, contaminant level and/or pressure information; current, voltage, temperature, contaminant level and/or pressure thresholds; user profile information, vehicle profile information, security codes, credentials, security certificates, passwords, vehicle information, historical vehicle usage and/or usage; patterns; vehicle diagnostic data; etc.

The instructions are executable by the controller 410 to control operation of the locking mechanism controller 306 in response to input from remote systems such as those of external devices including but not limited to: a volt sensor, a voltmeter, a current sensor, an ammeter, a watt sensor, a wattmeter, an electrical resistance sensor, an ohmmeter, a fuse, a temperature sensor, a resistance temperature detector (RTD), a thermistor, thermocouple, a diode, thermostat, a thermometer, a pressure sensor, an air pressure sensor, a contaminant sensor, etc., operably coupled to the portable electrical energy storage device 106z or to a circuit to which the portable electrical energy storage device 106z is connected, charging devices, vehicles, key fobs, user identification devices (cards, electronic keys, etc.), vehicles, collection, charging and distribution machines, collection, charging and distribution machine service systems, service centers, user mobile devices, user vehicles, and end user or operator input, or any applicable combination thereof. The controller 410 may also receive signals from various sensors and/or components of an external device via the communications subsystem 406 of the locking mechanism controller 306. This information may include information that characterizes or is indicative of the authenticity, authorization level, operation, status, or condition of such components and/or external devices.

The communications subsystem 406 may include one or more communications modules or components which facilitate communications with the sensors 528 and/or the various components of the wireless device 330, collection, charging and distribution machine 102 of FIG. 1 (e.g., such as to receive a security code), and/or of other external devices, such that data may be exchanged between the locking mechanism controller 306 and the external devices for authentication purposes. The communications subsystem 406 may provide wired and/or wireless communications. The communications subsystem 406 may include one or more ports, wireless receivers, wireless transmitters or wireless transceivers to provide wireless signal paths to the various remote components or systems. The communications subsystem 406 may, for example, include components enabling short range (e.g., via Bluetooth, near field communication (NFC), radio frequency identification (RFID) components and protocols) or longer range wireless communications (e.g., over a wireless LAN, satellite, or cellular network) and may include one or more modems or one or more Ethernet or other types of communications cards or components for doing so. The remote communications subsystem 406 may include connections to one or more bridges or routers suitable to handle network traffic including switched packet type communications protocols (TCP/IP), Ethernet or other networking protocols.

In some embodiments, some or all of the components of the locking mechanism controller 306 actuate one or more actuators 502 (shown in FIGS. 5 to 7) of the portable electrical energy storage device compartment locking mechanism 320 (e.g., by a wireless control signal) sent via the communications subsystem 406.

The power interface 420 is configured to receive power from a power source 516 (shown in FIGS. 5-7) via power connection 314 to provide power to the locking mechanism controller 306. The power interface 420 includes various components operable for performing the above functions such as electrical transformers, converters, rectifiers, etc. The power source 516 may be a separate power source than the portable electrical energy storage device 106z.

Figure 5:
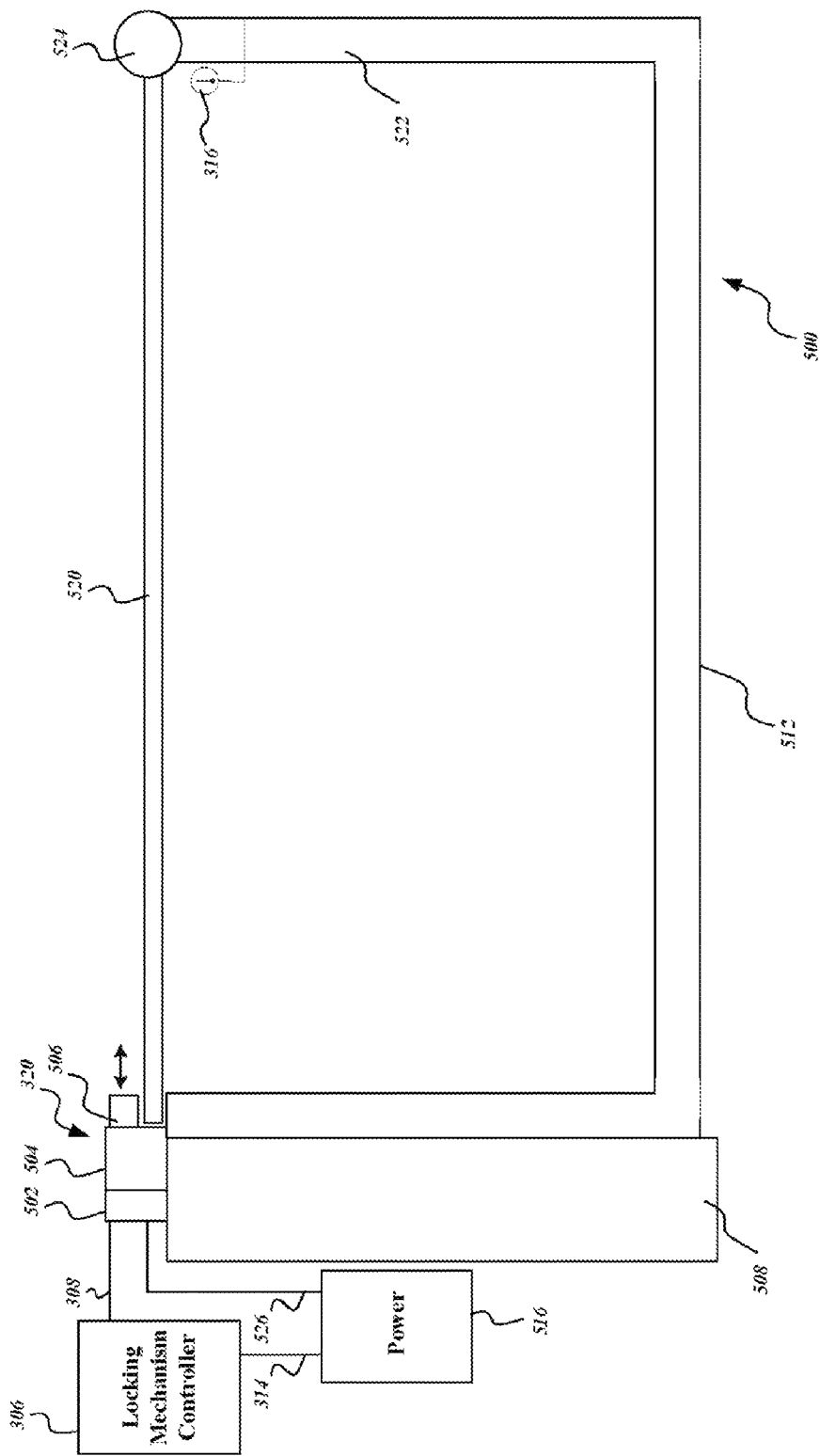
FIG. 5 is a cross-sectional elevation view of a locked, empty portable electrical energy storage device compartment configured to hold the portable electrical energy storage device of FIG. 1 coupled to the portable locking mechanism controller of FIG. 3A, according to one non-limiting illustrated embodiment.

FIG. 5 is a cross-sectional elevation view of a locked, empty portable electrical energy storage device compartment 500 configured to hold the portable electrical energy storage device 106z of FIG. 1 coupled to the portable locking mechanism controller 306 of FIG. 3A, according to one non-limiting illustrated embodiment.

Shown is a portable electrical energy storage device compartment housing 512, a part of a vehicle 508, a portable electrical energy storage device compartment locking mechanism 320, a locking mechanism controller 306 and a power source 516. In one embodiment, the portable electrical energy storage device compartment locking mechanism 320 is located outside the portable electrical energy storage device compartment housing 512 and fixed to a part of the vehicle 508 (as shown in the example of FIG. 5). In other embodiments, the portable electrical energy storage device compartment locking mechanism 320 is located inside or otherwise fixed to the portable electrical energy storage device compartment housing 512 and/or vehicle. In each embodiment, however, the portable electrical energy storage device compartment locking mechanism 320 is configured to lock, latch, unlock and/or unlatch, or otherwise secure or provide access to the portable electrical energy storage device compartment 500.

For example, the portable electrical energy storage device compartment 500 has a top opening through which the portable electrical energy storage device 106z may be placed into the portable electrical energy storage device compartment 500 and removed from the portable electrical energy storage device compartment 500. Once the portable electrical energy storage device 106z is placed in the portable electrical energy storage device compartment 500, the portable electrical energy storage device compartment housing 512 surrounds the portable electrical energy storage device 106z except at the top opening. As shown in FIG. 5, the portable electrical energy storage device compartment 500 has a lid 520 covering the top opening of the portable electrical energy storage device compartment 500. The lid 420 is hingedly attached to the top of a side wall 522 of the portable electrical energy storage device compartment 500 at a hinge 524 such that when the lid 520 is opened, a portable electrical energy storage device 106z may be placed in the portable electrical energy storage device compartment 500 or removed from the portable electrical energy storage device compartment 500.

Figure 6:
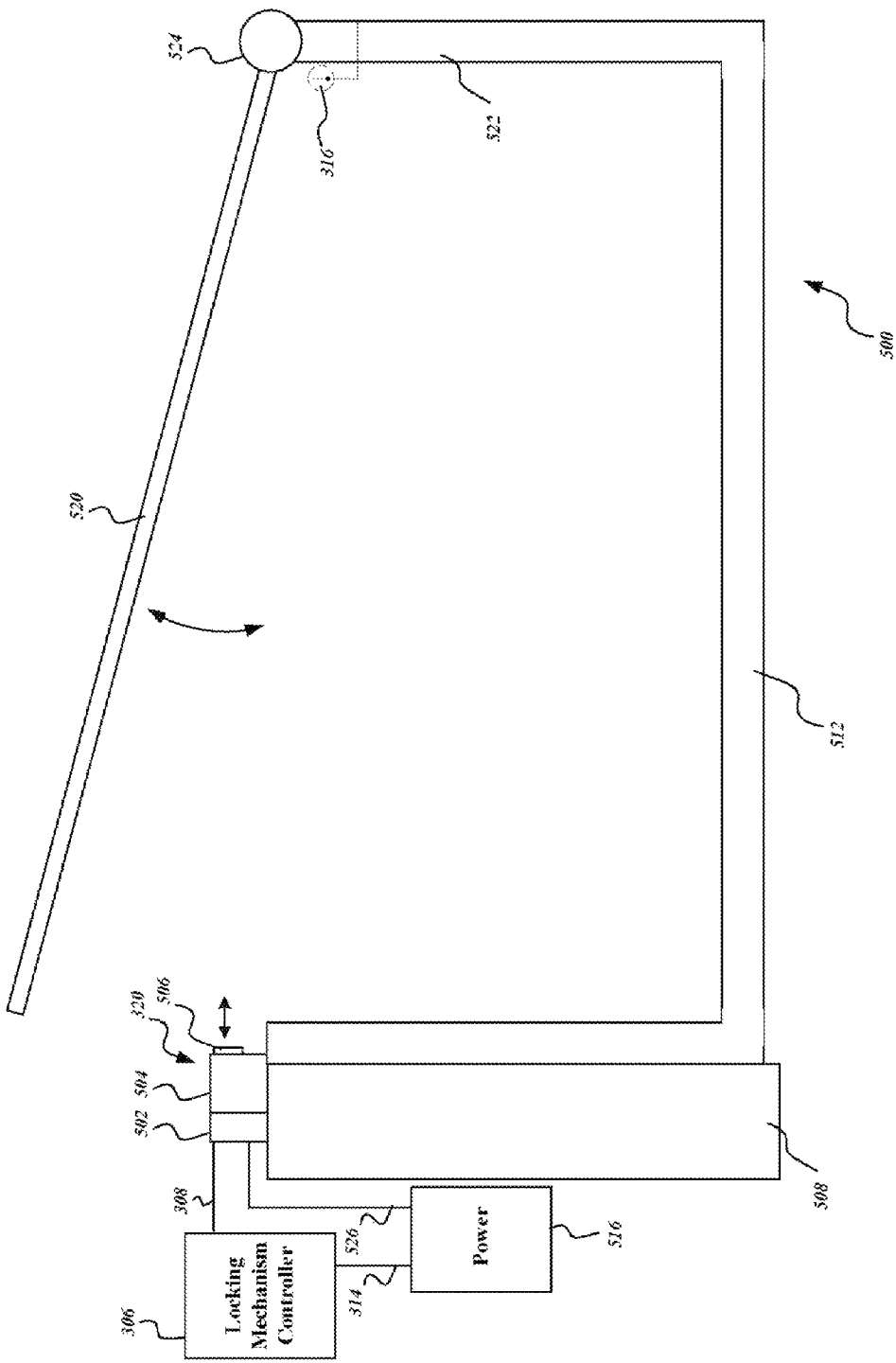
FIG. 6 is a cross-sectional elevation view of the empty portable electrical energy storage device compartment of FIG. 5 in an unlocked and open state, according to one non-limiting illustrated alternative embodiment.

The portable electrical energy storage device compartment locking mechanism 320 has a slidable bolt 506 which partially covers an end of the lid 520 opposite the hinge 524 when the lid 520 is in a closed position as shown in FIG. 5. This puts the portable electrical energy storage device compartment 500 in a locked or latched state by blocking the lid 520 from moving upward on the hinge 524 to an open position. The slidable bolt 506 is slidable on a bolt track or through bolt housing 504 fixedly attached to the vehicle part 508. However, in other embodiments, the bolt housing 504 may be fixedly attached to the compartment housing 512. When the portable electrical energy storage device compartment locking mechanism 320 is in an unlocked state, the slidable bolt 506 is retracted into the bolt housing 504 to not cover any portion of the lid 520 and thus allow the lid 520 to be opened (as shown in FIG. 6).

The portable electrical energy storage device compartment locking mechanism 320 is coupled to the locking mechanism controller 306 via a control line 308 and coupled to the power source via power line 526. For example, one or more control signals received from the locking mechanism controller 306 via control line 308 may affect the operation of one or more actuators 502 (only one illustrated) to cause the slidable bolt 506 to move. For instance, a control signal may cause movement of an actuator 502 between a first and a second position or change a magnetic field produced by the actuator 502. The actuator 502 may take any of a variety of forms, including but not limited to a solenoid, an electric motor such as a stepper motor, or an electromagnet. The actuator 502 may alternatively be coupled to operate a different latch, lock or other type of retainer mechanism for reversibly locking the portable electrical energy storage device compartment lid 520.

The actuator 502 may be coupled to operate a latch, lock or other retainer mechanism (not shown) in addition to or instead of the bolt 506. The latch, lock or other retainer mechanism may selectively secure or retain the lid 520 to prevent access to the portable electrical energy storage device compartment 500. For instance, the latch, lock or other retainer mechanism may physically couple to a complementary structure that is part of the housing 512 or the lid 520 of the portable electrical energy storage device compartment 500. Also for example, the actuator 502 may open and/or close a different latch or lock, allowing an end user to open the lid 520 or allowing the lid 520 to open automatically via a spring or other device.

The compartment housing 512 may provide protection to prevent or deter tampering with the electrical energy storage device, and may be formed of suitably strong and resilient materials (e.g., ABS plastic). Such may not only prevent or deter tampering, but may leave a visible indication of any tampering attempts. For example, the housing 512 may include a strong outer layer of a first color (e.g., black) and a layer of a second color (e.g., fluorescent orange) thereebeneath. Such will render attempts to cut through the housing 512 visibly apparent. In some embodiments, the compartment 500 may be sealed once closed to prevent leakage of fluid from the portable electrical energy storage device 106z and/or to withstand sudden changes in pressure within the compartment 500, and may have pressure release valves (not shown), air vents (not shown), built-in sensors such as those of sensors 528 (e.g., thermometer or temperature sensor 316, a pressure sensor (not shown), etc.), and/or windows (not shown) to read the various sensors or meters of the compartment or of the portable electrical energy storage device 106z, etc. One or more of such features may be activated, actuated and/or used by the locking mechanism controller 306 based on information from sensors 528 and/or other information regarding an unsafe condition of a portable electrical energy storage device 106z located inside the compartment 500.

FIG. 6 shows a cross-sectional elevation view of the empty portable electrical energy storage device compartment 500 of FIG. 5 in an unlocked and open state, according to one non-limiting illustrated alternative embodiment.

In some embodiments, mechanical, electric and/or electronic mechanisms may be used that provide the locking mechanism controller 306 with an indication of whether the portable electrical energy storage device 106z is present in the portable electrical energy storage device compartment 500 via control line 308. For example, if the portable electrical energy storage device compartment 500 were in the state shown in FIG. 5 (i.e., in a locked state without a portable electrical energy storage device detected by the detection mechanism 528 as being present in the portable electrical energy storage device compartment 500), once the locking mechanism controller 306 receives information regarding authentication of a wireless external device (e.g., a driver's key fob or other wireless device), the locking mechanism controller 306 will cause the portable electrical energy storage device compartment locking mechanism 320 to automatically unlock or unlatch the lid 520 to allow the lid 520 to be opened as shown in FIG. 6, and the portable electrical energy storage device 106z to be placed therein.

Figure 7:
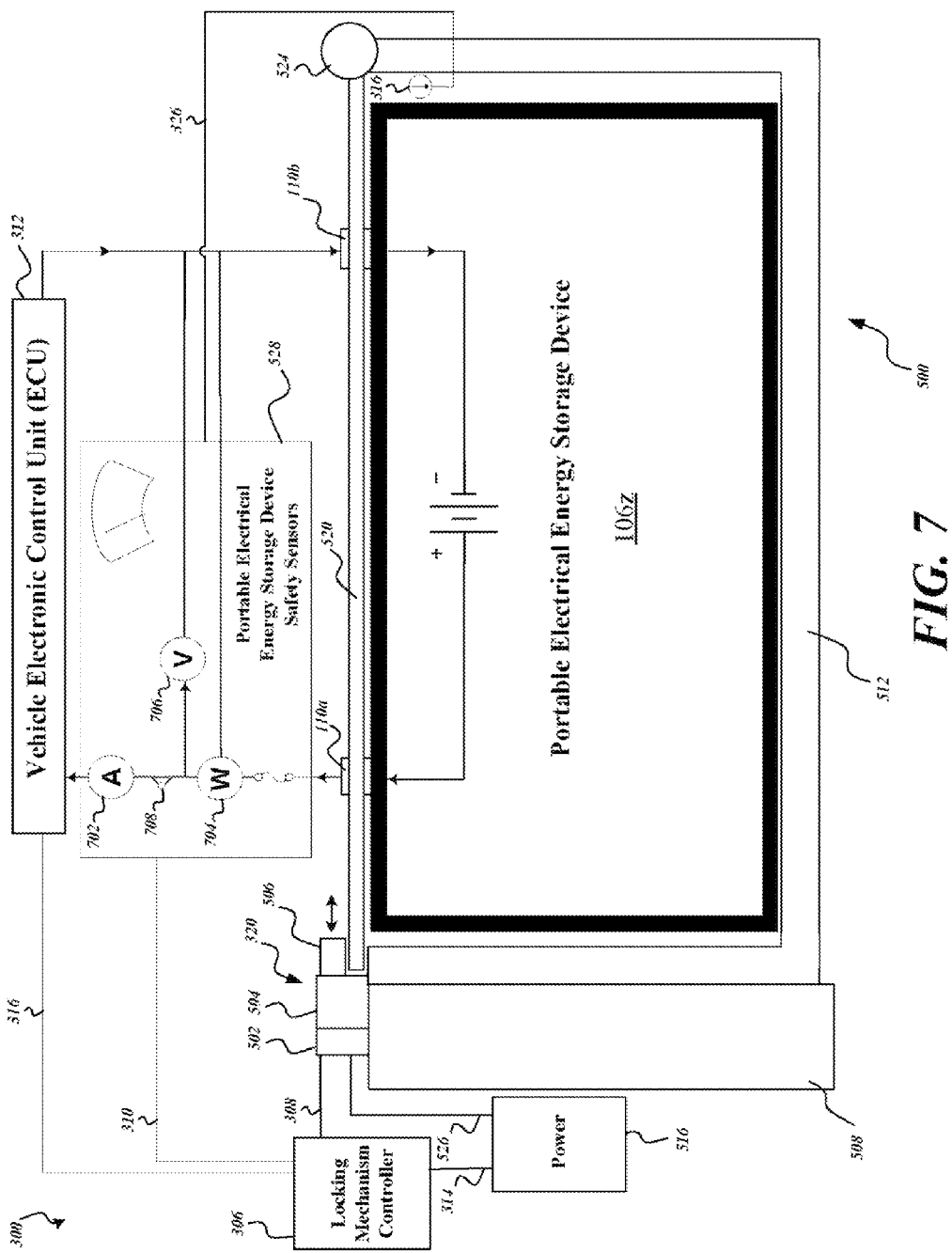
FIG. 7 is a cross-sectional elevation view of the portable electrical energy storage device compartment of FIG. 5 in a locked state holding the portable electrical energy storage device of FIG. 1 and coupled to portable electrical energy storage device safety sensors of the portable electrical energy storage device compartment locking system, according to one non-limiting illustrated alternative embodiment.

FIG. 7 is a cross-sectional elevation view of the portable electrical energy storage device compartment 500 of FIG. 5 in a locked state holding the portable electrical energy storage device of FIG. 1 and coupled to portable electrical energy storage device safety sensors 528 of the portable electrical energy storage device compartment locking system, according to one non-limiting illustrated alternative embodiment.

The locking mechanism controller 306 receives information regarding one or more unsafe conditions from the portable electrical energy storage device safety sensors 528 over communication line 310 connected to portable electrical energy storage device safety sensors 528. In response to receiving information regarding an unsafe condition from the portable electrical energy storage device safety sensors 528 over communication line 310, the locking mechanism controller 306 determines whether the compartment 500 configured to hold the portable electrical energy storage device 106z is in a desired state to have the compartment 500 locked. If the locking mechanism controller 306 determines the portable electrical energy storage device is in the desired state to have the compartment 500 locked, then it sends a signal over communication line 308 to the portable electrical energy storage device compartment locking mechanism 320 causing the portable electrical energy storage device compartment locking mechanism 320 to lock the compartment 500 in which the portable electrical energy storage device 106z is located to prevent a user from opening the compartment 500 and thus help protect the user against the unsafe condition. The compartment 500 is shown in such a locked position in FIG. 7.

For example, the unsafe condition may be a potential or existing catastrophic failure of the portable electrical energy storage device 106z in the compartment (e.g., a meltdown, explosion or dangerous leak, etc.). Thus, a temperature level, a voltage level and/or a current level of the portable electrical energy storage device 106z and/or a circuit to which the portable electrical energy storage device 106z is connected being above a particular respective threshold may be indicative of such an unsafe condition. Also, a temperature, contaminant level or pressure level inside the compartment 500 in which the portable electrical energy storage device 106z is located, or inside the portable electrical energy storage device 106z itself, being above a particular respective threshold may be indicative of such an unsafe condition. Thus, the desired state to have the compartment locked may be a state in which one or more of a temperature level, a voltage level and a current level of a circuit to which the portable electrical energy storage device 106z is connected is above a particular respective threshold. Also, alone or in combination with such factors, the desired state to have the compartment locked may be a state in which one or more of a temperature, contaminant level, or pressure level inside the compartment 500 in which the portable electrical energy storage device 106z is located, or inside the portable electrical energy storage device 106z itself, is above a particular respective threshold. As explained above, such threshold may be based on the specifications of the portable electrical energy storage device 106z, including, for example, a maximum current level, temperature, or voltage level the portable electrical energy storage device 106z can sustain before failure.

In some embodiments, locking mechanism controller 306, in response to receiving the information regarding the unsafe condition of the portable electrical energy storage device 106z from the portable electrical energy storage device safety sensors 528, sends a signal via communication line 316 to the vehicle's electronic control unit 312 to reduce or eliminate a current power draw by the vehicle 108 from the portable electrical energy storage device 106z. Such reduction or elimination of the current power draw by the vehicle 108 from the portable electrical energy storage device 106z may resolve, reduce or postpone such an unsafe condition and/or prevent it from worsening. This may be in addition to or instead of determining to lock the compartment in which the portable electrical energy storage device 106z is located. The locking mechanism controller 306 may select which threshold(s) to use in its determination of whether to send a signal to the vehicle's electronic control unit 312 to reduce or eliminate a current power draw by the vehicle 108 from the portable electrical energy storage device 106z and/or to lock the compartment in which the portable electrical energy storage device 106*z* is located based on such portable electrical energy storage device specifications as described above.

Accordingly, portable electrical energy storage device safety sensors 528 may include one or more sensors coupled to the locking mechanism controller 306 via communication line 310 that sense such conditions indicative of the unsafe condition. For example, as shown in FIG. 7, such sensors may include, but are not limited to, a current sensor or ammeter 702, a watt sensor or wattmeter 704 and/or a voltage sensor or voltage meter 706, each operably coupled to the circuit including the portable electrical energy storage device 106*z* and the vehicle electronic control unit 312 as shown in FIG. 7 in order to detect unsafe conditions of the portable electrical energy storage device 106*z*. Also, a thermal sensor 708 may also be part of the portable electrical energy storage device safety sensors 528. Additionally or alternatively a thermometer 316 located inside the compartment 500 may also be part of the portable electrical energy storage device safety sensors 528, shown as operably connected via communication line 326 that goes through a side wall of the housing 512. The portable electrical energy storage device safety sensors 528 may include additional, fewer or different combinations of sensors than those shown in FIG. 7. Overall, in various applicable embodiments, the portable electrical energy storage device safety sensors 528 may include one or more of: a volt sensor, a voltmeter, a current sensor, an ammeter, a watt sensor, a wattmeter, an electrical resistance sensor, an ohmmeter, a fuse, a temperature sensor, a resistance temperature detector (RTD), a thermistor, thermocouple, a diode, thermostat, a thermometer, a pressure sensor, an air pressure sensor, a contaminant sensor, etc., operably coupled to the portable electrical energy storage device 106*z* or to a circuit to which the portable electrical energy storage device 106*z* is connected. Such portable electrical energy storage device safety sensors 528 may be mechanical, analog, digital, integrated circuit sensors, or any applicable combination thereof.

As shown in FIG. 7, the lid 520 may have openings or holes to allow the terminals 110*a* and 110*b* of the portable electrical energy storage device 106*z* to be accessed when the portable electrical energy storage device 106*z* is present in the portable electrical energy storage device compartment 500 with the lid 520 closed, such that the terminals 110*a* and 110*b* may be operably connected to a vehicle such as the scooter or bike 108 to power the vehicle. However, in various other embodiments, such access to the terminals 110*a* and 110*b* of the portable electrical energy storage device 106*z* is not through the lid 520, but instead through other holes or access passages (not shown) in the housing 512 of the compartment 500. In yet other embodiments, the compartment 500 may also include one or more components of the vehicle 108 powered by the portable electrical energy storage device 106*z*, including the vehicle electronic control unit 312, the motor (not shown), and/or one or more components of portable electrical energy storage device compartment locking system 300. In this embodiment, no access holes or openings in the lid 520 leading out the compartment 500 are needed to connect the terminals 110*a* and 110*b* to such components located inside the compartment 500.

FIG. 8 shows a method 800 of operating the locking mechanism controller 306 of FIGS. 3-7, according to one non-limiting illustrated embodiment.

At 802, the portable electrical energy storage device compartment locking system receives information via at least one communications module regarding an unsafe condition of a portable electrical energy storage device in a compartment configured to hold the portable electrical energy storage device.

At 804, the portable electrical energy storage device compartment locking system, in response to receiving the information regarding the unsafe condition, determines whether the portable electrical energy storage device is in a desired state to have the compartment locked.

At 806, if it is determined the portable electrical energy storage device is in the desired state to have the compartment locked, then the portable electrical energy storage device compartment locking system locks a portable electrical energy storage device compartment locking mechanism of the compartment to protect a user against the unsafe condition.

FIG. 9 shows a method 900 of the locking mechanism controller of FIGS. 3-7 making a determination regarding locking a portable electrical energy storage device compartment locking mechanism, according to one non-limiting illustrated embodiment.

At 902, the portable electrical energy storage device compartment locking system receives information regarding an unsafe condition of a portable electrical energy storage device in a compartment configured to hold the portable electrical energy storage device.

At 904, the portable electrical energy storage device compartment locking system makes a determination regarding locking a portable electrical energy storage device compartment locking mechanism, based on the information regarding the unsafe condition of the portable electrical energy storage device in the compartment.

FIG. 10 shows a high level method 1000 of the locking mechanism controller of FIGS. 3-7 sending a signal to the electronic control unit of the vehicle to reduce or eliminate a current power draw from the portable electrical energy storage device, according to one non-limiting illustrated embodiment.

At 1002, the portable electrical energy storage device compartment locking system receives information via the at least one communications module regarding an unsafe condition of a portable electrical energy storage device in the compartment.

At 1004, in response to receiving the information regarding the unsafe condition, the portable electrical energy storage device compartment locking system sends a signal to the electronic control unit to reduce or eliminate a current power draw from a portable electrical energy storage device in the compartment.

The various methods described herein may include additional acts, omit some acts, and/or may perform the acts in a different order than set out in the various flow diagrams.

The foregoing detailed description has set forth various embodiments of the devices and/or processes via the use of block diagrams, schematics, and examples. Insofar as such block diagrams, schematics, and examples contain one or more functions and/or operations, in light of the teaching of the disclosure herein, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via one or more microcontrollers. However, in light of the teaching of the disclosure herein, those skilled in the art will recognize that the embodiments disclosed herein, in whole or in part, can be equivalently implemented in standard integrated circuits (e.g., Application Specific Integrated Circuits or ASICs), as one or more computer programs executed by one or more computers (e.g., as one or more programs running on one or more computer systems), as one or more programs executed by on one or more controllers (e.g., microcontrollers) as one or more programs executed by one or more processors (e.g., microprocessors), as firmware, or as virtually any combination thereof, and that designing the circuitry and/or writing the code for the software and/or firmware would be well within the skill of one of ordinary skill in the art in light of the teachings of this disclosure.

When logic is implemented as software and stored in memory, logic or information can be stored on any applicable non-transitory computer-readable medium for use by or in connection with any processor-related system or method. In the context of this disclosure, a memory is a nontransitory computer- or processor-readable storage medium that is an electronic, magnetic, optical, or other physical device or means that non-transitorily contains or stores a computer and/or processor program. Logic and/or the information can be embodied in any computer-readable medium for use by or in connection with an instruction execution system, apparatus, or device, such as a computer-based system, processor-containing system, or other system that can fetch the instructions from the instruction execution system, apparatus, or device and execute the instructions associated with logic and/or information.

In the context of this specification, a "computer-readable medium" can be any physical element that can store the program associated with logic and/or information for use by or in connection with the instruction execution system, apparatus, and/or device. The computer-readable medium can be, for example, but is not limited to, an electronic, magnetic, optical, electromagnetic, infrared, or semiconductor system, apparatus or device. More specific examples (a non-exhaustive list) of the computer readable medium would include the following: a portable computer diskette (magnetic, compact flash card, secure digital, or the like), a random access memory (RAM), a read-only memory (ROM), an erasable programmable read-only memory (EPROM, EEPROM, or Flash memory), a portable compact disc read-only memory (CDROM), and digital tape.

The various embodiments described above can be combined to provide further embodiments. To the extent that they are not inconsistent with the specific teachings and definitions herein, all of the U.S. patents, U.S. patent application publications, U.S. patent applications, foreign patents, foreign patent applications and non-patent publications referred to in this specification and/or listed in the Application Data Sheet, including but not limited to: U.S. provisional patent application Ser. No. 61/511,900, entitled "APPARATUS, METHOD AND ARTICLE FOR COLLECTION, CHARGING AND DISTRIBUTING POWER STORAGE DEVICES, SUCH AS BATTERIES" and filed Jul. 26, 2011; U.S. provisional patent application Ser. No. 61/534,753, entitled "APPARATUS, METHOD AND ARTICLE FOR REDISTRIBUTING POWER STORAGE DEVICES, SUCH AS BATTERIES, BETWEEN COLLECTION, CHARGING AND DISTRIBUTION MACHINES" and filed Sep. 14, 2011; U.S. provisional patent application Ser. No. 61/534,761, entitled "APPARATUS, METHOD AND ARTICLE FOR AUTHENTICATION, SECURITY AND CONTROL OF POWER STORAGE DEVICES, SUCH AS BATTERIES" and filed Sep. 14, 2011; U.S. provisional patent application Ser. No. 61/534,772, entitled "APPARATUS, METHOD AND ARTICLE FOR AUTHENTICATION, SECURITY AND CONTROL OF POWER STORAGE DEVICES, SUCH AS BATTERIES, BASED ON USER PROFILES" and filed Sep. 14, 2011; U.S. provisional patent application Ser. No. 61/543,720, entitled "DETECTABLE INDICATION OF AN ELECTRIC MOTOR VEHICLE STANDBY MODE" and filed Oct. 5, 2011; U.S. provisional patent application Ser. No. 61/511,887, entitled "THERMAL MANAGEMENT OF COMPONENTS IN ELECTRIC MOTOR DRIVE VEHICLES" and filed Jul. 26, 2011; U.S. provisional patent application Ser. No. 61/511,880, entitled "DYNAMICALLY LIMITING VEHICLE OPERATION FOR BEST EFFORT ECONOMY" and filed Jul. 26, 2011; U.S. provisional patent application Ser. No. 61/546,411, entitled "DRIVE ASSEMBLY FOR ELECTRIC POWERED DEVICE" and filed Oct. 12, 2011; and U.S. provisional patent application Ser. No. 61/872,126, entitled "PORTABLE ELECTRICAL ENERGY STORAGE DEVICE" and filed Aug. 30, 2013 are incorporated herein by reference, in their entirety. Aspects of the embodiments can be modified, if necessary, to employ systems, circuits and concepts of the various patents, applications and publications to provide yet further embodiments.

While generally discussed in the environment and context of collection, charging and distribution of portable electrical energy storage devices for use with personal transportation vehicles such as all-electric scooters and/or motorbikes, the teachings herein can be applied in a wide variety of other environments, including other vehicular as well as non-vehicular environments.

The above description of illustrated embodiments, including what is described in the Abstract of the Disclosure, is not intended to be exhaustive or to limit the embodiments to the precise forms disclosed. Although specific embodiments and examples are described herein for illustrative purposes, various equivalent modifications can be made without departing from the spirit and scope of the disclosure, as will be recognized by those skilled in the relevant art in light of the teaching of the disclosure herein.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A portable electrical energy storage device compartment system, comprising:
   at least one controller; and
   at least one communications module coupled to the at least one controller, wherein the at least one controller:
      receives information via the at least one communications module regarding an unsafe condition of a portable electrical energy storage device in a compartment configured to hold the portable electrical energy storage device; and
      in response to receiving the information regarding the unsafe condition:
         determines whether the portable electrical energy storage device is in a desired state to have the compartment locked; and
         if it is determined the portable electrical energy storage device is in the desired state to have the compartment locked, then locks a portable electrical energy storage device compartment locking mechanism of the compartment to protect a user against the unsafe condition.

2. The portable electrical energy storage device compartment system of claim 1 wherein the desired state to have the compartment locked is a state in which one or more of a temperature level, a voltage level and a current level of a circuit to which the portable electrical energy storage device is connected is above a particular respective threshold.

3. The portable electrical energy storage device compartment system of claim 2 wherein the unsafe condition is a potential or existing catastrophic failure of the portable electrical energy storage device in the compartment.

4. The portable electrical energy storage device compartment system of claim 1 wherein the desired state to have the compartment locked is a state in which one or more of a temperature level of the portable electrical energy storage device and a temperature level of an inside of the compartment is above a particular respective threshold.

5. The portable electrical energy storage device compartment system of claim 1, wherein the at least one communications module receives the information regarding the unsafe condition from one or more sensors coupled to a circuit to which the portable electrical energy storage device is connected and communicates the information to the at least one controller to enable the at least one controller to lock the portable electrical energy storage device compartment locking mechanism.

6. The portable electrical energy storage device compartment system of claim 1, further comprising:
the portable electrical energy storage device compartment locking mechanism coupled to the at least one controller; and
one or more sensors coupled to the at least one controller that sense conditions indicative of the unsafe condition, the conditions indicative of the unsafe condition including conditions regarding one or more of: a temperature level of a circuit to which the portable electrical energy storage device is connected, a voltage level of a circuit to which the portable electrical energy storage device is connected, a current level of a circuit to which the portable electrical energy storage device is connected, a temperature of the portable electrical energy storage device, a temperature of an inside of the compartment in which the portable electrical energy storage device is located, and a short circuit of a circuit to which the portable electrical energy storage device is connected, wherein the at least one controller sends a control signal in a manner to lock the portable electrical energy storage device compartment locking mechanism if the controller determines the portable electrical energy storage device is in the desired state to have the compartment locked based on the conditions indicative of the unsafe conditions sensed by the one or more sensors.

7. The portable electrical energy storage device compartment system of claim 1 wherein the at least one controller is further configured to make a determination regarding unlocking the portable electrical energy storage device based on one or more of: information regarding the unsafe condition no longer being present and performance of a locking mechanism override operation.

8. The portable electrical energy storage device compartment system of claim 1 wherein the portable electrical energy storage device compartment system is coupled to a vehicle.

9. The portable electrical energy storage device compartment system of claim 1 wherein the portable electrical energy storage device compartment system is coupled to a collection, charging and distribution machine.

10. The portable electrical energy storage device compartment system of claim 1 wherein the at least one controller sends the information regarding an unsafe condition to an external device via a wireless signal transmitted to the external device.

11. The portable electrical energy storage device compartment system of claim 1, further comprising a power source, separate from the portable electrical energy storage device, coupled to the at least one controller and the portable electrical energy storage device compartment locking mechanism to provide power to the portable electrical energy storage device compartment locking mechanism and the at least one controller.

12. A method of operating a portable electrical energy storage device compartment system, the method comprising:
receiving, by the portable electrical energy storage device compartment system, information regarding an unsafe condition of a portable electrical energy storage device in a compartment configured to hold the portable electrical energy storage device; and
making a determination, by the portable electrical energy storage device compartment system, regarding locking a portable electrical energy storage device compartment locking mechanism based on the information regarding the unsafe condition of the portable electrical energy storage device in the compartment.

13. The method of claim 12, further comprising:
receiving, by a communications module of the portable electrical energy storage device compartment system, the information regarding the unsafe condition from one or more sensors coupled to a circuit to which the portable electrical energy storage device is connected; and
communicating, by a communications module of the portable electrical energy storage device compartment system, the information to at least one controller of the portable electrical energy storage device compartment system to enable the at least one controller to lock the portable electrical energy storage device compartment locking mechanism.

14. The method of claim 13 wherein the received information regarding the unsafe condition includes information regarding one or more of: a temperature level of a circuit to which the portable electrical energy storage device is connected, a voltage level of a circuit to which the portable electrical energy storage device is connected, a current level of a circuit to which the portable electrical energy storage device is connected, a temperature of the portable electrical energy storage device, and a temperature of an inside of the compartment in which the portable electrical energy storage device is located.

15. A vehicle, comprising:
a motor to propel the vehicle at least partially powered by a portable electrical energy storage device;
an electronic control unit coupled to the portable electrical energy storage device that controls how much power to draw from the portable electrical energy storage device to power the motor;
a compartment configured to hold the portable electrical energy storage device;
at least one controller of a locking mechanism of the compartment; and
at least one communications module coupled to the at least one controller, wherein the at least one controller:
receives information via the at least one communications module regarding an unsafe condition of a portable electrical energy storage device in the compartment; and
in response to receiving the information regarding the unsafe condition:
determines whether the portable electrical energy storage device is in a desired state to have the compartment locked; and if it is determined the portable electrical energy storage device is in the desired state to have the compartment locked, then locks the locking mechanism of the compartment to protect a user against the unsafe condition.

16. The vehicle of claim 15 wherein the at least one controller:
in response to receiving the information regarding the unsafe condition, sends a signal to the electronic control unit to reduce or eliminate a current power draw from the portable electrical energy storage device in the compartment.

17. The vehicle of claim 16 wherein the information regarding the unsafe condition is indicative of an unsafe current level of a circuit to which the portable electrical energy storage device and electronic control unit are connected.

18. A portable electrical energy storage device, comprising: at least one portable electrical energy storage device cell; and one or more sensors coupled to the at least one portable electrical energy storage device cell and to at least one controller, wherein the one or more sensors sense conditions indicative of an unsafe condition of the portable electrical energy storage device, the conditions indicative of the unsafe condition including conditions regarding one or more of: a temperature level of a circuit to which the portable electrical energy storage device is connected, a voltage level of a circuit to which the portable electrical energy storage device is connected, a current level of a circuit to which the portable electrical energy storage device is connected, a temperature of the portable electrical energy storage device, a temperature of an inside of a compartment in which the portable electrical energy storage device is located, and a short circuit of a circuit to which the portable electrical energy storage device is connected; and
at least one communications module coupled to the at least one controller, wherein the at least one communications module communicates information regarding the conditions indicative of an unsafe condition to the at least one controller; and the at least one controller, in response to receiving the information regarding the unsafe condition: determines whether the portable electrical energy storage device is in a desired state to have the compartment locked; and if it is determined the portable electrical energy storage device is in the desired state to have the compartment locked, then sends a signal to activate a portable electrical energy storage device compartment locking mechanism.

19. The portable electrical energy storage device of claim 18, wherein the at least one communications module communicates information regarding the conditions indicative of an unsafe condition to an external device.

20. The portable electrical energy storage device of claim 19 wherein the at least one communications module wirelessly communicates information regarding the conditions indicative of an unsafe condition to the external device.

* * * * *